(12) United States Patent
Kwak et al.

(10) Patent No.: US 11,792,754 B2
(45) Date of Patent: Oct. 17, 2023

(54) PHYSICAL BROADCAST CHANNEL (PBCH) RESOURCE ALLOCATION FOR REDUCED BANDWIDTH DEVICES

(71) Applicant: QUALCOMM Incorporated, San Diego, CA (US)

(72) Inventors: Yongjun Kwak, San Diego, CA (US); Hung Dinh Ly, San Diego, CA (US); Jing Lei, San Diego, CA (US); Yuchul Kim, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/357,654

(22) Filed: Jun. 24, 2021

(65) Prior Publication Data

US 2022/0417874 A1 Dec. 29, 2022

(51) Int. Cl.
*H04W 56/00* (2009.01)
*H04W 72/30* (2023.01)
(Continued)

(52) U.S. Cl.
CPC ....... *H04W 56/001* (2013.01); *H04J 11/0073* (2013.01); *H04J 11/0076* (2013.01);
(Continued)

(58) Field of Classification Search
None
See application file for complete search history.

(56) References Cited

U.S. PATENT DOCUMENTS

| 2016/0135058 | A1* | 5/2016 | Chen | H04W 76/40 370/329 |
| 2017/0006578 | A1* | 1/2017 | Rico Alvarino | H04L 5/0048 |

(Continued)

FOREIGN PATENT DOCUMENTS

| WO | WO-2018057600 A1 * | 3/2018 | ........... H04L 5/001 |
| WO | WO-2020147694 A1 * | 7/2020 | ........... H04W 56/001 |

OTHER PUBLICATIONS

Ericsson: "Reduced Maximum UE Bandwidth for RedCap", 3GPP TSG-RAN WG1 Meeting #105-e, R1-2104179, 3rd Generation Partnership Project, Mobile Competence Centre, 650, Route Des Lucioles, F-06921 Sophia-Antipolis Cedex, France, vol. RAN WG1, No. e-Meeting, May 19, 2021-May 27, 2021, 29 Pages, May 12, 2021, XP052010667, the whole document.

(Continued)

*Primary Examiner* — Jay L Vogel
(74) *Attorney, Agent, or Firm* — Norton Rose Fulbright US LLP

(57) ABSTRACT

This disclosure provides systems, methods, and devices for wireless communication that support allocation of resources for a physical broadcast channel (PBCH) for reduced bandwidth devices. In a first aspect, a method includes monitoring, by a user equipment (UE) configured for reduced bandwidth operation, at least a subset of a first set of time and frequency resources allocated to a synchronization signal block (SSB) for UEs configured for non-reduced bandwidth operation. The SSB includes synchronization signals and a PBCH. The method includes monitoring, by the UE, a second set of time and frequency resources allocated to the PBCH for UEs configured for reduced bandwidth operation. The method includes receiving, by the UE, the synchronization signals and the PBCH within at least the subset of the first set of time and frequency (Continued)

resources and the second set of time and frequency resources. Other aspects and features are also claimed and described.

30 Claims, 11 Drawing Sheets

(51) Int. Cl.
*H04J 11/00* (2006.01)
*H04W 72/0446* (2023.01)
*H04W 72/0453* (2023.01)
*H04L 5/00* (2006.01)

(52) U.S. Cl.
CPC .......... *H04L 5/0048* (2013.01); *H04L 5/0053* (2013.01); *H04W 72/0446* (2013.01); *H04W 72/0453* (2013.01); *H04W 72/30* (2023.01)

(56) References Cited

U.S. PATENT DOCUMENTS

| | | | |
|---|---|---|---|
| 2017/0311250 A1* | 10/2017 | Rico Alvarino | H04W 4/70 |
| 2018/0248642 A1* | 8/2018 | Si | H04L 27/26025 |
| 2018/0310262 A1* | 10/2018 | Ly | H04L 5/005 |
| 2019/0109700 A1* | 4/2019 | Liu | H04L 27/2662 |
| 2019/0319748 A1* | 10/2019 | Nam | H04W 72/1242 |
| 2020/0287676 A1* | 9/2020 | Jo | H04L 5/0048 |

OTHER PUBLICATIONS

International Search Report and Written Opinion—PCT/US2022/072850—ISA/EPO—dated Sep. 28, 2022.

\* cited by examiner

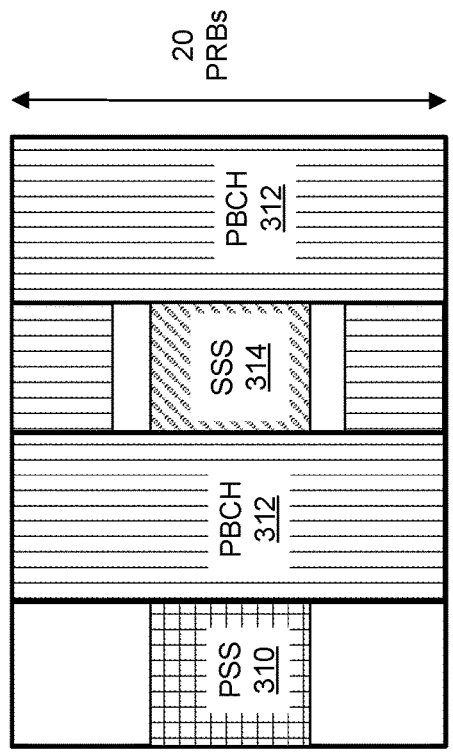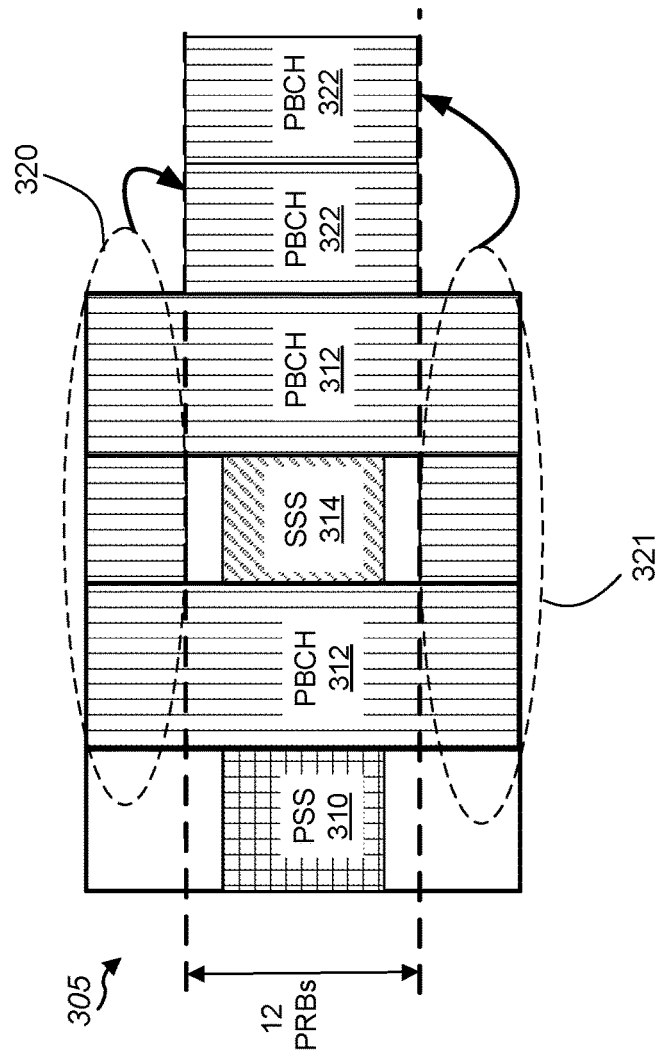
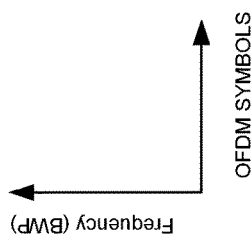
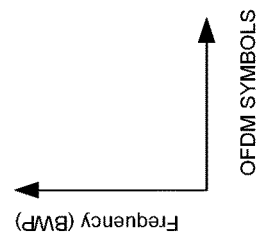

PHYSICAL BROADCAST CHANNEL (PBCH) RESOURCE ALLOCATION FOR REDUCED BANDWIDTH DEVICES

TECHNICAL FIELD

Aspects of the present disclosure relate generally to wireless communication systems, and more particularly, to systems that support reduced bandwidth devices, such as devices that support 20 megahertz (20 MHz) or less bandwidth. Some features may enable and provide improved communications, including allocation of resources for a physical broadcast channel (PBCH) for reduced bandwidth devices.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

5th generation new radio (5G-NR) wireless communication provide improved quality communications and enhanced features through the use of higher bandwidths, such as the "millimeter wave" bandwidth. Although such improvements have been implemented in smartphones and other devices, some of the benefits of the technology have not been extended to less complex devices. To illustrate, research into supporting 5G-NR concepts in "reduced capabilities" (RedCap) devices, "NR-light" devices, and "NR-superlight" devices is progressing. Such research focuses on relaxing peak throughput, latency, and reliability requirements associated with typical 5G-NR to extend the benefits to devices with less complex processors and smaller battery lifetimes, such as wireless sensors, metering devices, asset tracking devices, and personal Internet-of-Things (IoT) devices, as non-limiting examples. Research goals include supporting low power wide area (LPWA) networks and devices via improvements in coverage, complexity, and power consumption, in addition to utilization of low-power and low-complexity sidelink communications. One focus of NR-superlight device research is to support devices that communicate via reduced bandwidths, such as bandwidths of 20 megahertz (MHz) or less. However, such reduced bandwidth operation may cause problems when attempting to support 5G-NR functionality, which is designed for larger bandwidth operation.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes monitoring, by a user equipment (UE) having a first type, at least a subset of a first set of time and frequency resources allocated to a synchronization signal block (SSB) for UEs having a second type. The SSB includes a primary synchronization signal (PSS), a secondary synchronization signal (SSS), and a physical broadcast channel (PBCH). The method also includes monitoring, by the UE, a second set of time and frequency resources allocated to the PBCH for the UEs having the first type. The method also includes receiving, by the UE from a base station, the PSS, the SSS, and the PBCH within the at least the subset of the first set of time and frequency resources and the second set of time and frequency resources.

In an additional aspect of the disclosure, an apparatus includes at least one processor and a memory coupled to the at least one processor. The at least one processor is configured to monitor, by a UE having a first type, at least a subset of a first set of time and frequency resources allocated to an SSB for UEs having a second type. The SSB includes a PSS, an SSS, and a PBCH. The at least one processor is also configured to monitor, by the UE, a second set of time and frequency resources allocated to the PBCH for the UEs having the first type. The at least one processor is also configured to receive, by the UE from a base station, the PSS, the SSS, and the PBCH within the at least the subset of the first set of time and frequency resources and the second set of time and frequency resources.

In an additional aspect of the disclosure, an apparatus includes means for monitoring, by a UE having a first type, at least a subset of a first set of time and frequency resources allocated to an SSB for UEs having a second type. The SSB includes a PSS, an SSS, and a PBCH. The apparatus also includes means for monitoring, by the UE, a second set of time and frequency resources allocated to the PBCH for the UEs having the first type. The apparatus also includes means for receiving, by the UE from a base station, the PSS, the SSS, and the PBCH within the at least the subset of the first set of time and frequency resources and the second set of time and frequency resources.

In an additional aspect of the disclosure, a non-transitory computer-readable medium stores instructions that, when executed by a processor, cause the processor to perform operations. The operations include monitoring, by a UE having a first type, at least a subset of a first set of time and frequency resources allocated to an SSB for UEs having a second type. The SSB includes a PSS, an SSS, and a PBCH. The operations also include monitoring, by the UE, a second set of time and frequency resources allocated to the PBCH for the UEs having the first type. The operations also include receiving, by the UE from a base station, the PSS, the SSS, and the PBCH within the at least the subset of the first set of time and frequency resources and the second set of time and frequency resources In an additional aspect of the disclosure, a method includes transmitting, to a UE having a first type, at least a portion of an SSB via at least a subset of a first set of time and frequency resources allocated to the SSB for UEs having a second type. The at least a portion of the SSB includes a PSS, an SSS, and a PBCH. The method also includes transmitting, to the UE, a second portion of the PBCH via a second set of time and frequency resources.

In an additional aspect of the disclosure, an apparatus includes at least one processor and a memory coupled to the at least one processor. The at least one processor is configured to transmit, to a UE having a first type, at least a portion of an SSB via at least a subset of a first set of time and frequency resources allocated to the SSB for UEs having a second type. The at least a portion of the SSB includes a PSS, an SSS, and a PBCH. The at least one processor is also configured to transmit, to the UE, a second portion of the PBCH via a second set of time and frequency resources.

In an additional aspect of the disclosure, an apparatus includes means for transmitting, to a UE having a first type, at least a portion of an SSB via at least a subset of a first set of time and frequency resources allocated to the SSB for UEs having a second type. The at least a portion of the SSB includes a PSS, an SSS, and a PBCH. The apparatus also includes means for transmitting, to the UE, a second portion of the PBCH via a second set of time and frequency resources.

In an additional aspect of the disclosure, a non-transitory computer-readable medium stores instructions that, when executed by a processor, cause the processor to perform operations. The operations include transmitting, to a UE having a first type, at least a portion of an SSB via at least a subset of a first set of time and frequency resources allocated to the SSB for UEs having a second type. The at least a portion of the SSB includes a PSS, an SSS, and a PBCH. The operations also include transmitting, to the UE, a second portion of the PBCH via a second set of time and frequency resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 3A-C illustrate examples of a synchronization signal block (SSB) configurations for non-reduced bandwidth devices, reduced bandwidth devices, or both, according to one or more aspects.

Like reference numbers and designations in the various drawings indicate like elements.

DETAILED DESCRIPTION

Figure 1:
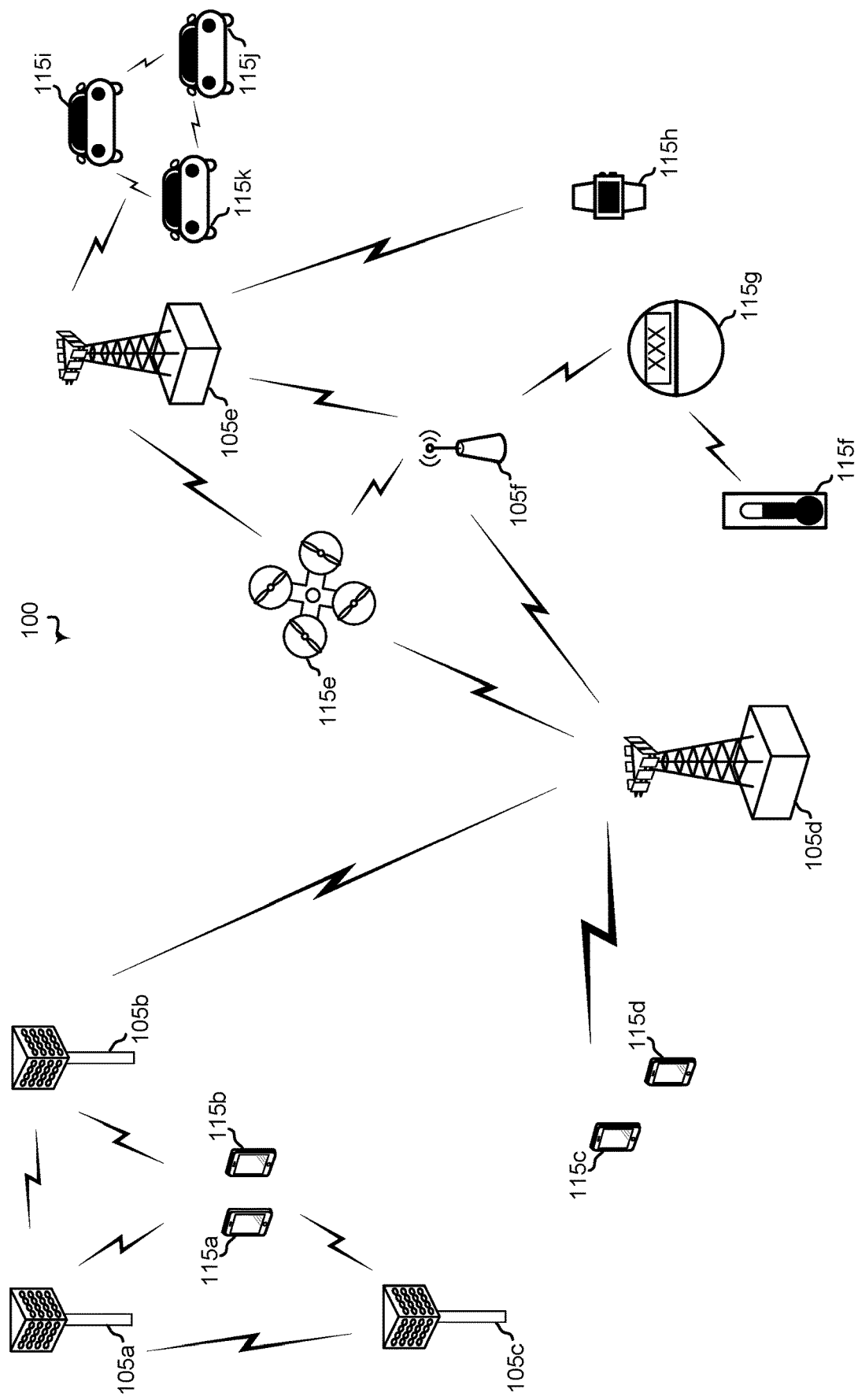
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support reduced bandwidth devices, such as devices that communicate via bandwidths of 20 megahertz (MHz) or less, particularly 5 MHz or less, in 5th generation new radio (5G-NR) wireless networks. In particular, the techniques described herein support allocation of resources for a physical broadcast channel (PBCH) for reduced bandwidth devices. To illustrate, wireless communication devices configured for 5 MHz or less operations, referred to herein as reduced bandwidth devices, "superlight" devices, or "NR-superlight" devices, may not fully support a PBCH that is designated for typical, non-reduced bandwidth devices. This may be because the resources allocated to the PBCH configured for non-reduced bandwidth devices may have a larger dimension in the frequency domain than an operating bandwidth of the reduced bandwidth devices. Thus, a PBCH configured for non-reduced bandwidth devices may only be partially usable by the reduced bandwidth devices. For example, within a typical synchronize signal block (SSB), 20 physical resource blocks (PRBs) in the frequency domain and multiple orthogonal frequency division multiplexing (OFDM) symbols in the time domain may be allocated to a PBCH, however, some reduced bandwidth devices (e.g., those configured with sub-carrier spacing of 30 kilohertz (kHz)) may be unable to support more than 12 PRBs in the frequency domain at some subcarrier spacings. Thus, only a portion (e.g., 12 PRBs) of frequency resources allocated to the PBCH may be usable by reduced bandwidth devices for wireless communications.

Accordingly, in addition to monitoring a portion of the PBCH resources designated for non-reduced bandwidth devices, a reduced bandwidth device of the present disclosure may also be configured to separately monitor additional resources (e.g., resources that are allocated to reduced bandwidth devices and not allocated to non-reduced bandwidth devices) to receive the PBCH. For example, the reduced bandwidth devices may receive the PBCH via a combination of a subset of the PBCH resources designated for non-reduced bandwidth devices and an additional set of time and frequency resources. In this manner, a base station may allocate first PBCH resources to non-reduced bandwidth devices and second PBCH resources to reduced bandwidth devices, with the second PBCH resources including some of the first PBCH resources (e.g., a frequency range that is supported by the reduced bandwidth devices but is less than the frequency range of the first PBCH resources). Although described above as extending the PBCH to second resources for the reduced bandwidth devices, in some other implementations, the second resources may be allocated for PBCH repetition.

To illustrate operation of a reduced bandwidth device, a user equipment (UE) having a first type (e.g., a reduced bandwidth device configured for 5 MHz or less operations (or 20 MHz or less as another example)) may monitor at least a subset of a first set of time and frequency resources allocated to an SSB for UEs having a second type (e.g., non-reduced bandwidth device). The SSB may include a primary synchronization signal (PSS), a secondary synchronization signal (SSS), and a physical broadcast channel (PBCH). The UE may also monitor a second set of time and frequency resources allocated to the PBCH for the UEs having the first type. The UE may then receive, from the base station, the PSS, the SSS, and the PBCH within the at least the subset of the first set of time and frequency resources and the second set of time and frequency resources. To illustrate, the first set of time and frequency resources may have a larger dimension in the frequency domain than the second set of time and frequency resources, and the combination of the subset of the first set of time and frequency resources and the second set of time and frequency resources may have a larger dimension in the time domain than the first set of time and frequency resources.

Particular implementations of the subject matter described in this disclosure may be implemented to realize one or more of the following potential advantages or benefits. In some aspects, the present disclosure provides techniques for allocating different PBCH resources to reduced bandwidth devices and non-reduced bandwidth devices. For example, a PBCH resource allocation for reduced bandwidth devices may include at least some resources of a PBCH resource allocation for non-reduced bandwidth devices and some additional resources. For example, the reduced bandwidth devices may receive a PBCH via a first set of time and frequency resources having a larger dimension in the frequency domain than is supported by the reduced bandwidth devices (e.g., the PBCH may be allocated to a frequency bandwidth that is larger than an operating bandwidth of the reduced bandwidth devices), and the reduced bandwidth devices may also receive the PBCH via a second set of time and frequency resources having a smaller dimension in the frequency domain that is supported by the reduced bandwidth devices. Thus, reduced bandwidth devices may be able to receive the same amount of information in a PBCH as non-reduced bandwidth devices, while operating at a reduced bandwidth compared to the other types of devices. In this manner, support for reduced bandwidth devices can be achieved without reconfiguring non-reduced bandwidth devices.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
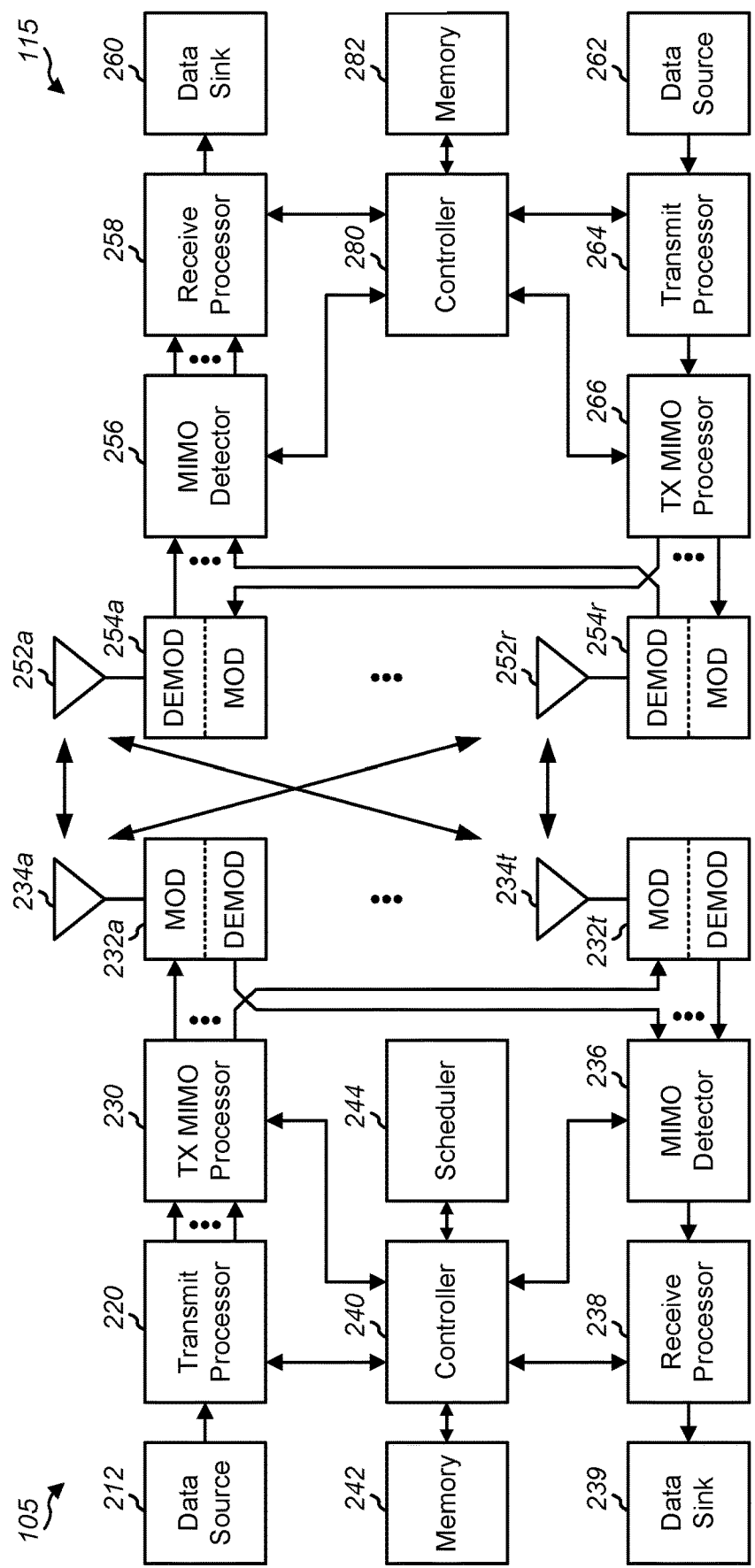
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 7 and 9, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3C:
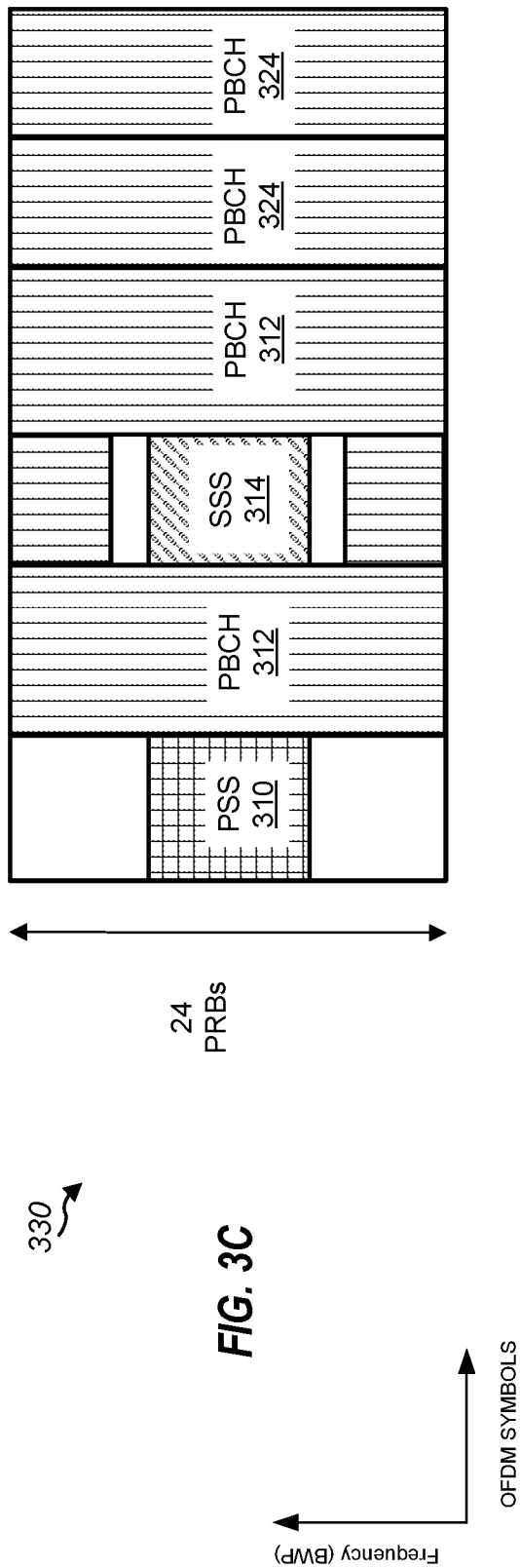

FIGS. 3A-C illustrate examples of SSB configurations for non-reduced bandwidth devices, reduced bandwidth devices, or both, according to one or more aspects. FIG. 3A illustrates a configuration of an SSB 300 for non-reduced bandwidth devices. The SSB 300 may represent a group of time resources (e.g., OFDM symbols) and frequency resources (e.g., PRBs) allocated to particular communications from a base station to devices within a communication range of the base station. In the example shown in FIG. 3A, the SSB 300 includes a primary synchronization signal (PSS) 310, a secondary synchronization signal (SSS) 314, and a PBCH 312. The PSS 310 may be transmitted in a first OFDM symbol of the SSB 300 and may occupy 127 subcarriers (e.g., between approximately 10 and 11 PRBs) in the frequency domain of the SSB 300. The remaining PRBs at the first OFDM symbol may be unallocated (e.g., empty). The SSS 314 may be transmitted in a third OFDM symbol of the SSB 300 and may occupy the same set of PRBs in the SSB 300 as the PSS 310. In some implementations, there may be one or more unallocated PRBs (or portions thereof) on each side of SSS 314 in the frequency domain. The PBCH 312 may be transmitted within the second, third, and fourth OFDM symbols of the SSB 300. For example, resources allocated to the PBCH 312 may occupy 20 PRBs (or 240 subcarriers, i.e., an entirety of the bandwidth allocated to the SSB 300) at each of the second and fourth OFDM symbols and two blocks of 48 subcarriers (e.g., 4 PRBs) at the third OFDM symbol. The SSS 314 may be allocated to PRBs between the PRBs allocated to the PBCH 312 at the third OFDM symbol.

FIG. 3B illustrates a configuration of an SSB 305 usable by both non-reduced bandwidth devices and reduced bandwidth devices. The SSB 305 is a modified configuration of the SSB 300 in that the SSB 305 is extended in the time domain to enable reduced bandwidth devices to receive the same amount of information via a PBCH while operating at a bandwidth of 5 MHz, at least for some sub-carrier spacings (e.g., 30 kHz). To illustrate, a UE configured with sub-carrier spacing of 30 kHz and operating at a bandwidth of 5 MHz or less may be configured to communicate via 12 PRBs (e.g., 144 subcarriers) in the frequency domain. If a center of the SSB 305 is configured to be located at a center operating frequency of the operating bandwidth of the reduced bandwidth devices, the UE may receive the PSS 310 and the SSS 314 because these signals are allocated within a 12 PRB frequency range supported by the reduced bandwidth devices. However, because the PBCH 312 is allocated to at least some PRBs outside of this 12 PRB frequency range, the UE may not be able to receive information communicated via at least a portion of the PBCH 312. In order to avoid reducing the amount of PBCH messaging to the reduced bandwidth devices, the SSB 305 may include an additional PBCH 322 for use by the reduced bandwidth devices. The additional PBCH 322 may occupy the same 12 PRBs that are supported by the reduced bandwidth devices at additional OFDM symbols (e.g., a fifth and sixth OFDM symbol). The additional PBCH 322 may include information that is communicated via the portions of the PBCH 312 that are outside the 12 PRB frequency range supported by the reduced bandwidth devices. For example, information communicated via a first group of PRBs 320 and a second group of PRBs 321 at the second, third, and fourth OFDM symbols may be communicated via the additional PBCH 322 (e.g., may occupy the same 12 PRBs at the fifth and sixth OFDM symbols). Allocating additional time and frequency resources to communicate the information that is also communicated via the groups of PRBs 320 and 321 may be referred to as "extending" the PBCH 312 with the additional PBCH 322. In this manner, both types of devices may use the configuration of the SSB 305 and receive the same amount of information via a PBCH, although some of the resources allocated to the PBCH are different for the different types of devices. To illustrate, the PBCH for the non-reduced bandwidth devices may include the PBCH 312 allocated to 20 PRBs, as described for the SSB 300 in FIG. 3A, whereas the PBCH for the reduced bandwidth devices may include a portion of the PBCH 312 (e.g., a 12 PRB subset of the frequency resources allocated to the PBCH 312 at the second and fourth OFDM symbols) and the additional PBCH 322 to compensate for the groups of PRBs 320 and 321, which are outside the operating bandwidth of the reduced bandwidth devices.

FIG. 3C illustrates a configuration of an SSB 330 usable by both non-reduced bandwidth devices and reduced bandwidth devices. The SSB 330 is a modified configuration of the SSB 300 in that the SSB 330 is extended in the time domain to enable reduced bandwidth devices to receive replicated information via a PBCH. To illustrate, a UE configured with sub-carrier spacing of 15 kHz and operating at a bandwidth of 5 MHz or less may be configured to communicate via 24 PRBs in the frequency domain. If a center of the SSB 330 is configured to be located at a center operating frequency of the operating bandwidth of the reduced bandwidth devices, the UE may receive the PSS 310, the PBCH 312, and the SSS 314 because these signals are allocated within a 24 PRB frequency range supported by the reduced bandwidth devices. As a comparison, instead of covering 12 PRBs of 20 PRBs total in the case of the reduced bandwidth devices configured with sub-carrier spacing of 30 KHz, the reduced bandwidth devices configured with sub-carrier spacing of 15 KHz may cover an entirety of 24 PRBs in their 5 MHz bandwidth range due to less spacing between sub-carriers and PRBs. Thus, the frequency resources allocated to the reduced bandwidth devices configured with sub-carrier spacing of 15 KHz are shown to be having a range of 24 PRBs. In other words, unlike the implementation described in FIG. 3B, since the PBCH 312 is allocated to PRBs within this 24 PRB frequency range, the UE may be able to receive information communicated via the PRBs associated with PBCH 312. However, in some such implementations, the PBCH 312 may be replicated in PRBs outside of the 24 PRB frequency range during the same OFDM symbols, or it may be beneficial to replicate some portions of the PBCH 312 (or all of the PBCH 312) and add them to the existing SSB 330. Accordingly, the SSB 330 may include a replicated PBCH 324 for use by the reduced bandwidth devices. The replicated PBCH 324 may occupy up to the number of PRBs that are supported by the reduced bandwidth devices at additional OFDM symbols (e.g., a fifth and sixth OFDM symbol). In some implementations, the number of PRBs that are supported can be 24 PRBs or less. The replicated PBCH 324 may include information that is communicated via at least some of the PBCH 312. For example, information communicated via 24 PRBs at the second and fourth OFDM symbols may be communicated via the replicated PBCH 324 at the fifth and sixth OFDM symbols. Replicating the information from PBCH 312 may be referred to as "enhancing" the PBCH 312 with the replicated PBCH 324.

Figure 4:
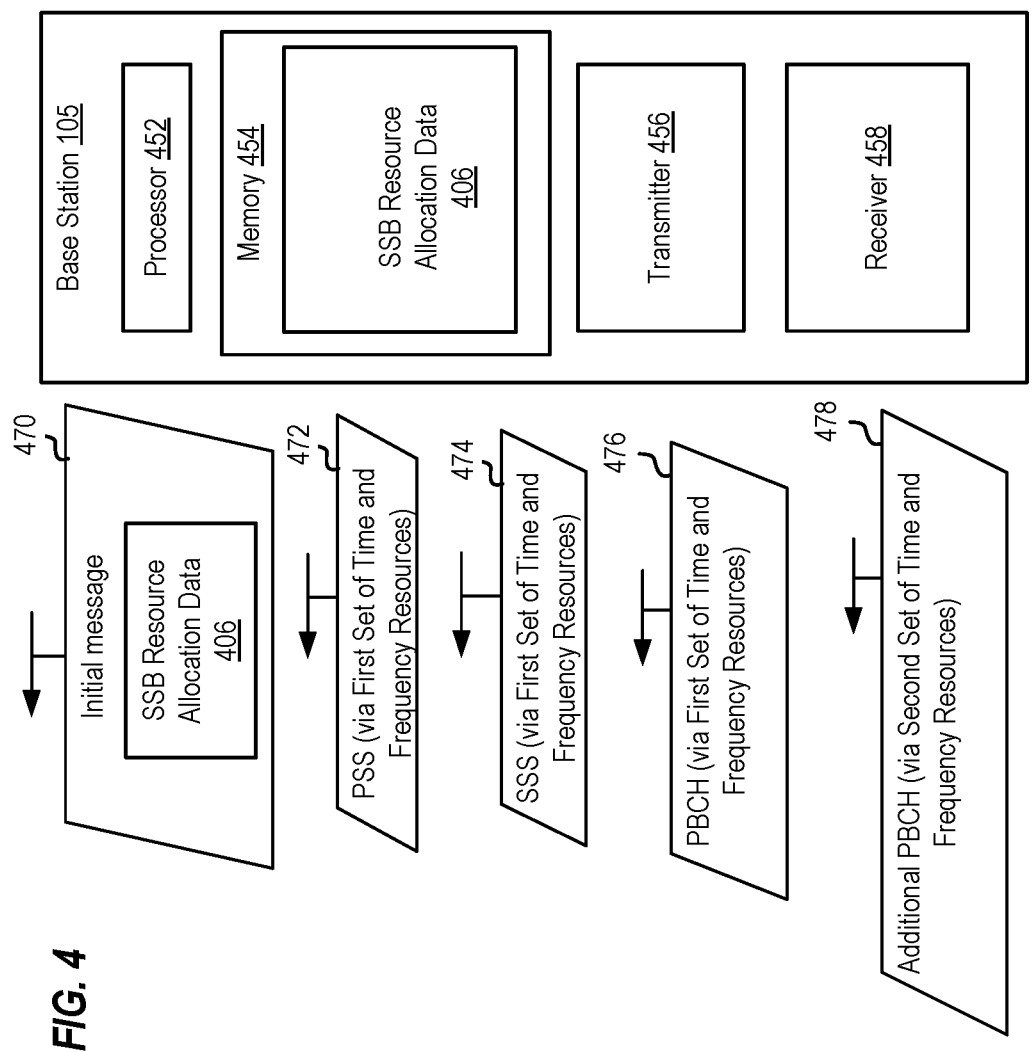
FIG. 4 is a block diagram of an example wireless communications system that supports allocation of resources for a physical broadcast channel (PBCH) for reduced bandwidth devices, according to one or more aspects.

FIG. 4 is a block diagram of an example wireless communications system 400 that supports allocation of resources for a PBCH for reduced bandwidth devices, according to one or more aspects. The PBCH resource allocation for reduced bandwidth devices (e.g., a first type of devices) may include at least some resources of a PBCH resource allocation associated with non-reduced bandwidth devices (e.g., a second type of devices, also referred to as typical devices, NR devices, legacy devices, or the like) and some additional resources associated with reduced bandwidth devices. For example, resources allocated to a PBCH for the reduced bandwidth devices may include at least some of a first set (e.g., a subset of the first set) of time and frequency resources allocated to a PBCH for non-reduced bandwidth devices. The resources allocated to the PBCH for the reduced bandwidth devices may also include a second set of time and frequency resources. In some implementations, the additional PBCH (e.g., the portion of the PBCH allocated to the second set of time and frequency resources) is also referred to as replicated PBCH which is associated with reduced bandwidth devices. In some implementations, the reduced bandwidth devices may be configured with sub-carrier spacing of 30 kHz and an operating bandwidth of 5 MHz or less. In some other implementations, the reduced bandwidth devices may be configured with sub-carrier spacing of 15 kHz and an operating bandwidth of 5 MHz or less. In some examples, the wireless communications system 400 may implement aspects of the wireless network 100. The wireless communications system 400 includes UE 115 and base station 105. Although one UE 115 and one base station 105 are illustrated, in some other implementations, the wireless communications system 400 may generally include multiple UEs 115, and may include more than one base station 105.

The UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). The processor 402 may be configured to execute instructions stored in the memory 404 to perform the operations described herein. In some implementations, the processor 402 includes or corresponds to one or more of the receive processor 258, the transmit processor 264, and the controller 280, and the memory 404 includes or corresponds to the memory 282.

The memory 304 includes or is configured to store SSB resource allocation data 406. The SSB resource allocation data 406 may indicate SSS, PSS, and PBCH resource allocations associated with non-reduced bandwidth devices (e.g., the second type) as well as additional or replicated PBCH resource allocations associated with reduced bandwidth devices (e.g., the first type). For example, the SSB resource allocation data 406 may indicate a subset of a first set of time and frequency resources allocated to an SSB that includes a PSS for both types of devices, an SSS for both types of devices, and a PBCH for non-reduced bandwidth devices. The SSB resource allocation data 406 may also indicate a second set of time and frequency resources allocated to an additional or replicated PBCH for reduced bandwidth devices. In addition to the first and second sets of time and frequency resources, in some implementations, the SSB resource allocation data 406 may also include or indicate an SSB pattern, PBCH repetition information, or a combination thereof. The SSB pattern may indicate a pattern in which SSB resource allocation is repeated within a time slot, and the PBCH repetition information may include a repetition pattern of the additional or replicated PBCH resource allocation relative to the SSB resource allocation within the same time slot. In some implementations, the SSB resource allocation data 406 may be defined in one or more wireless communication standard specifications, such as a 3GPP specification, as a non-limiting example. In some implementations, the SSB resource allocation data 406 is stored at the memory 404 during manufacture, setup, or deployment of the UE 115. Additionally or alternatively, the SSB resource allocation data 406 may be received from another device, such as being included in a software or firmware update for the UE 115, or from a base station (e.g., the base station 105) through an initial message (e.g., an initial message 470). The first set of time and frequency resources may correspond to the time resources (e.g., OFDM symbols one-four) and frequency resources (e.g., 20 PRBs) described with reference to FIG. 3A. The second set of time and frequency resources may correspond to the time resources (e.g., OFDM symbols five and six) and frequency resources (e.g., 12 PRBs) associated with the additional PBCH 322 described with reference to FIG. 3B. Alternatively, the second set of time and frequency resources may correspond to the time resources (e.g., OFDM symbols five and six) and frequency resources (e.g., 20 PRBs) associated with the replicated PBCH 324 described with reference to FIG. 3C. The received SSB 408 may indicate the SSB received via the resources allocated to PSS, SSS, and PBCH in the SSB resource allocation data 406.

The transmitter 416 is configured to transmit reference signals, control information and data to one or more other devices, and the receiver 418 is configured to receive references signals, synchronization signals, control information and data from one or more other devices. For example, the transmitter 416 may transmit signaling, control information and data to, and the receiver 418 may receive signaling, control information and data from, the base station 105. In some implementations, the transmitter 416 and receiver 418 may be integrated in one or more transceivers. Additionally or alternatively, the transmitter 416 or the receiver 418 may include or correspond to one or more components of the UE 115 described with reference to FIG. 2.

The base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). The processor 452 may be configured to execute instructions stored in the memory 454 to perform the operations described herein. In some implementations, the processor 452 includes or corresponds to one or more of the receive processor 238, the transmit processor 220, and the controller 240, and the memory 454 includes or corresponds to the memory 242. In some implementations, the memory 354 includes or is configured to store SSB resource allocation data 406.

The transmitter 456 is configured to transmit reference signals, synchronization signals, control information and data to one or more other devices, and the receiver 458 is configured to receive reference signals, control information and data from one or more other devices. For example, the transmitter 456 may transmit signaling, control information and data to, and the receiver 458 may receive signaling, control information and data from, the UE 115. In some implementations, the transmitter 456 and the receiver 458 may be integrated in one or more transceivers. Additionally or alternatively, the transmitter 456 or the receiver 458 may include or correspond to one or more components of the base station 105 described with reference to FIG. 2.

In some implementations, the wireless communications system 400 implements a 5G NR network. For example, the wireless communications system 400 may include multiple 5G-capable UEs 115 and multiple 5G-capable base stations 105, such as UEs and base stations configured to operate in accordance with a 5G NR network protocol such as that defined by the 3GPP. Additionally, the wireless communications system 400 may support reduced bandwidth (e.g., superlight) devices. For example, the UE 115 and the base station 105 may be configured to communicate via a reduced bandwidth (e.g., channel bandwidth), such as 5 MHz or less or 20 MHz or less, as non-limiting examples, and the base station 105 may be configured to communicate with other UEs via a larger bandwidth, such as 50, 100, 200, or 400 MHz, as non-limiting examples.

During operation of the wireless communications system 400, the UE 115 may determine one or more time and frequency resources to monitor for signals and messaging based on the SSB resource allocation data 406 stored at the UE 115. In some implementations, the SSB resource allocation data 406 may be received at the UE 115 from another device within the wireless communications system 400, such as the base station 105. To illustrate, the base station 105 may transmit an initial message 470 that includes the SSB resource allocation data 406 to the UE 115. In some such implementations, the base station 105 may determine which resources to allocate based on a device type of the intended receiving devices, such as whether the devices are superlight devices associated with a reduced operating bandwidth, or whether the devices are other types of devices that do not have such reduced operating bandwidths. For example, if the base station 105 determines that the intended receiving device is a reduced bandwidth device, in addition to providing SSB resource allocation data usable by non-reduced bandwidth devices, the base station 105 may provide additional PBCH resource allocation data for use by the reduced bandwidth device in the initial message 470. In some other implementations, the SSB resource allocation data 406 may be defined in one or more wireless communication standard specifications, such as a 3GPP standard, and stored at the memory 404 during manufacture, setup, or deployment of the UE 115 (and at the memory 454 during manufacture, setup, or deployment of the base station 105). In some such implementations, the SSB resource allocation data 406 may indicate multiple SSB resource allocations that are associated with different communication parameters. For example, the SSB resource allocation data 406 may indicate SSB resource allocations for reduced bandwidth devices that are associated with a sub-carrier spacing of 15 KHz or 30 KHz.

The UE 115 may monitor one or more time and frequency resources based on the SSB resource allocation data 406 (and the sub-carrier spacings associated with the SSB resource allocation data 406) for signaling and messaging from the base station 105. For example, the UE 115 may monitor time and frequency resources indicated by the SSB resource allocation data 406, and the time and frequency resources indicated by the SSB resource allocation data 406 may depend on the sub-carrier spacing configured for use at the UE 115. To illustrate, if the sub-carrier spacing configured for use at the UE 115 is 15 kHz, the time and frequency resources indicated by the SSB resource allocation data 406 may include a set of time and frequency resources that include resources allocated to a replicated PBCH, as described with reference to FIG. 3C. As another example, if the sub-carrier spacing configured for use at the UE 115 is 30 kHz, the time and frequency resources indicated by the SSB resource allocation data 406 may include a set of time and frequency resources that include resources allocated to an additional PBCH (e.g., an additional PBCH resource allocation), as described with reference to FIG. 3B.

The base station 105 may transmit signals and messages (e.g., via one or more channels) to the UE 115 via the set of time and frequency resources indicated by the SSB resource allocation data 406 as part of an SSB, and the UE 115 may monitor the time and frequency resources indicated by the SSB resource allocation data 406 to receive the signals and messages. The set of time and frequency resources may include a subset of a first set of time and frequency resources included in the SSB and a second set of time and frequency resources included in the SSB. To illustrate, the base station 105 may transmit a PSS 472 via the first set of time and frequency resources and an SSS 474 via the first set of time and frequency resources. The base station 105 may transmit the PSS 472 and the SSS 474 to both types of devices (e.g., reduced bandwidth devices and non-reduced bandwidth devices). The base station 105 may also transmit one or more messages within a PBCH 476 associated with non-reduced bandwidth devices via the first set of time and frequency resources. Additionally, the base station 105 may transmit one or more messages within an additional or replicated PBCH associated with reduced bandwidth devices. The UE 115 may monitor a subset of a first set of time and frequency resources to receive the PSS 472 and the SSS 474. The UE 115 may also monitor the subset of the first set of time and frequency resources and the second set of time and frequency resources to receive one or more messages via a portion of the PBCH 476 and an additional or replicated PBCH 478 via the second set of time and frequency resources, respectively.

As described above with reference to FIG. 3A, the first set of time and frequency resources may include or correspond to four OFDM symbols in the time domain and twenty PRBs in the frequency domain. The twenty PRBs may correspond to a bandwidth of more than 5 MHz, or more than 20 MHz, as non-limiting examples. In some implementations, as described above with reference to FIG. 3B, the subset of the first set of time and frequency resources may correspond to the same four OFDM symbols in time domain and 12 PRBs in the frequency domain (e.g., the center 12 PRBs of the 20 PRBs in FIG. 3A). For example, the subset of the first set of time and frequency resources may include or correspond to 12 PRBs when a subcarrier spacing configured at the UE 115 is 30 KHz. Alternatively, as described above with reference to FIG. 3C, the subset of the first set of time and frequency resources may correspond to the same four OFDM symbols in time domain and 20 PRBs in the frequency domain. For example, the subset of the first set of time and frequency resources may include or correspond to 20 PRBs when a subcarrier spacing configured at the UE 115 is 15 KHz. In implementations in which the UE 115 is configured with 30 kHz sub-carrier spacing, the UE 115 may receive one or more messages via a portion of the PBCH 476 (corresponding to a portion of the PBCH 312 of FIG. 3B that does not include the blocks of PRBs 320 and 321) and the additional or replicated PBCH 478 (corresponding to the additional PBCH 322 of FIG. 3B at the fifth and sixth OFDM symbols within the 12 PRB frequency range supported by the reduced bandwidth devices). In implementations in which the UE 115 is configured with 15 kHz sub-carrier spacing, the UE 115 may receive one or more messages via the PBCH 476 (corresponding to the PBCH 312 of FIG. 3C) and one or more replicated messages via the additional or replicated PBCH 478 (corresponding to the replicated PBCH 324 of FIG. 3C at the fifth and sixth OFDM symbols within the 20 PRB frequency range supported by the reduced bandwidth devices).

While monitoring the time and frequency resources, the UE 115 may receive the PSS 472, the SSS 474, and one or more messages within a PBCH allocated to at least the subset of the first set of time and frequency resources and the second set of time and frequency resources (e.g., a portion of the PBCH 476 and the additional or replicated PBCH 478). In some implementations, the frequency resources of the second set of time and frequency resources overlap the frequency resources of the subset of the first set of time and frequency resources. For example, as described with reference to FIG. 3B, the additional PBCH 322, which is allocated to the second set of time and frequency resources, may occupy frequency resources (e.g., 12 PRBs at the fifth and sixth OFDM symbols) that overlap with frequency resources (e.g., 12 PRBs at the first-fourth OFDM symbols) allocated to the subset of the first set of time and frequency resources. In such implementations, the time resources of the second set of time and frequency resources do not overlap in the time domain with the time resources of the first set of time and frequency resources. Continuing the same example described with reference to FIG. 3B, the time resources of the second set of time and frequency resources (e.g., the fifth and sixth OFDM symbols) are different from the time resources associated with the subset of the first set of time and frequency resources (e.g., the first-fourth OFDM symbols).

Although described above, and with reference to FIGS. 3B and 3C, as including two OFDM symbols that follow the OFDM symbols of the first set of time and frequency resources, in other implementations, the second set of time and frequency resources may include other OFDM symbols (e.g., other time resources). For example, the second set of time and frequency resources may include the first OFDM symbol before, and the first OFDM symbol after, the four OFDM symbols of the first set of time and frequency resources. As another example, the second set of time and frequency resources may include the first two OFDM symbols before the fourth OFDM symbols of the first set of time and frequency resources. In some implementations, the OFDM symbols (e.g., time resources) that are included in the second set of time and frequency resources may depend on which OFDM symbols (e.g., time resources) are allocated to the first set of time and frequency resources. For example, the second set of time and frequency resources may include two OFDM symbols before the four OFDM symbols of the first set of time and frequency resources if these are the fifth through eighth OFDM symbols of a slot, and the second set of time and frequency resources may include two OFDM symbols following the four OFDM symbols of the first set of time and frequency resources if these are the ninth through twelfth OFDM symbols of a slot. Examples of other possible positioning of the two OFDM symbols relative to the four OFDM symbols are shown in FIGS. 5 and 6.

In some implementations, PBCH replication may be configured for a particular subcarrier spacing, such as 15 KHz, and on a cell-by-cell basis. To illustrate, some base stations may be configured to perform PBCH replication as described with reference to FIG. 3C, and other base stations may be configured to transmit the PBCH as described with reference to FIG. 3A except within an operating bandwidth of the reduced bandwidth devices. Whether or not a base station is configured for PBCH repetition for reduced bandwidth devices may be indicated by cell identifiers (IDs) associated with the base stations. For example, base stations configured for PBCH replication may have cell IDs that indicate PBCH repetition, such as by having a particular bit of the cell ID set to a particular value, or using some other technique for indicating PBCH repetition configuration. The UE 115 may use the PSS 472 and the SSS 474 to determine the cell ID associated with the base station 105, and based on the cell ID, determine whether the base station 105 is configured for PBCH replication. To illustrate, the PSS 472 may carry a sector identifier (SID) and the SSS 474 may carry a group identifier (GID), and the UE 115 may determine the cell ID based on a combination of the SID and the GID. If the cell ID indicates PBCH replication, the base station 105 replicates and transmits a PBCH via the additional or replicated PBCH 478, as described with reference to FIG. 3C. Alternatively, if the cell ID does not indicate PBCH replication, the base station 105 transmits the PBCH 476 via the first set of time and frequency resources and does not transmit a replicated PBCH via the second set of time and frequency resources. In some implementations, the cell ID may indicate both whether PBCH replication is configured, and which of multiple repetition patterns are used, as further described with reference to FIG. 6.

As described with reference to FIG. 4, the present disclosure provides techniques for allocating different PBCH resources to reduced bandwidth devices and non-reduced bandwidth devices. For example, a PBCH resource allocation for UE 115 may include at least some resources of a PBCH resource allocation for non-reduced bandwidth devices and some additional resources. To illustrate, the UE 115 may receive a PBCH via a subset of a first set of time and frequency resources having a larger dimension in the frequency domain than is supported by the UE 115, and the UE 115 may also receive the additional or replicated PBCH 478 via a second set of time and frequency resources having a dimension in the frequency domain that is supported by the UE 115. Thus, the UE 115 may be able to receive the same amount of information in a PBCH as non-reduced bandwidth devices (e.g., via the PBCH 476), while operating at a reduced bandwidth compared to the other types of devices. In this manner, support for reduced bandwidth devices can be achieved without reconfiguring non-reduced bandwidth devices.

Figure 5:
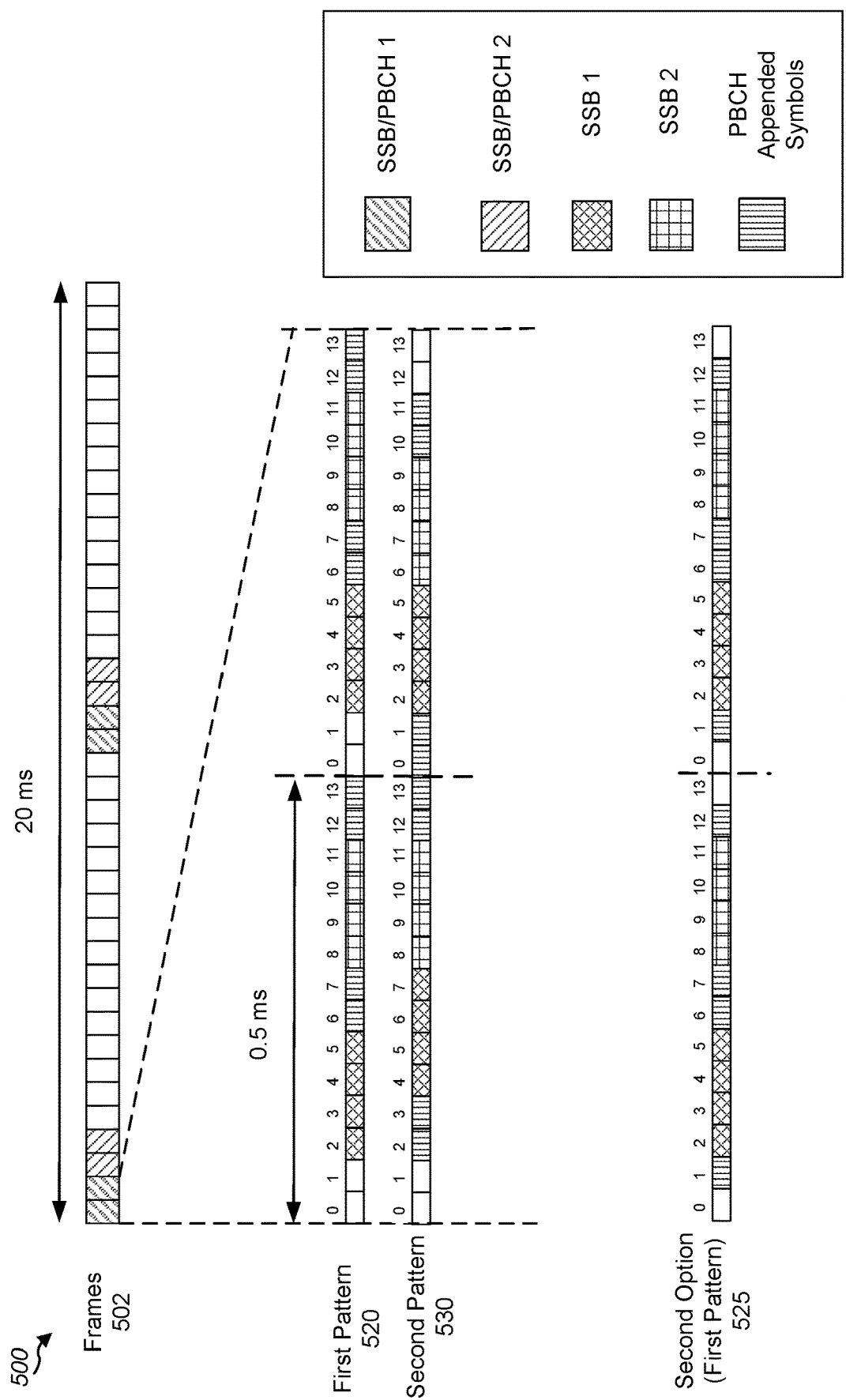
FIG. 5 illustrates examples of allocation of time resources to SSBs and additional PBCHs, according to one or more aspects.
Figure 6:
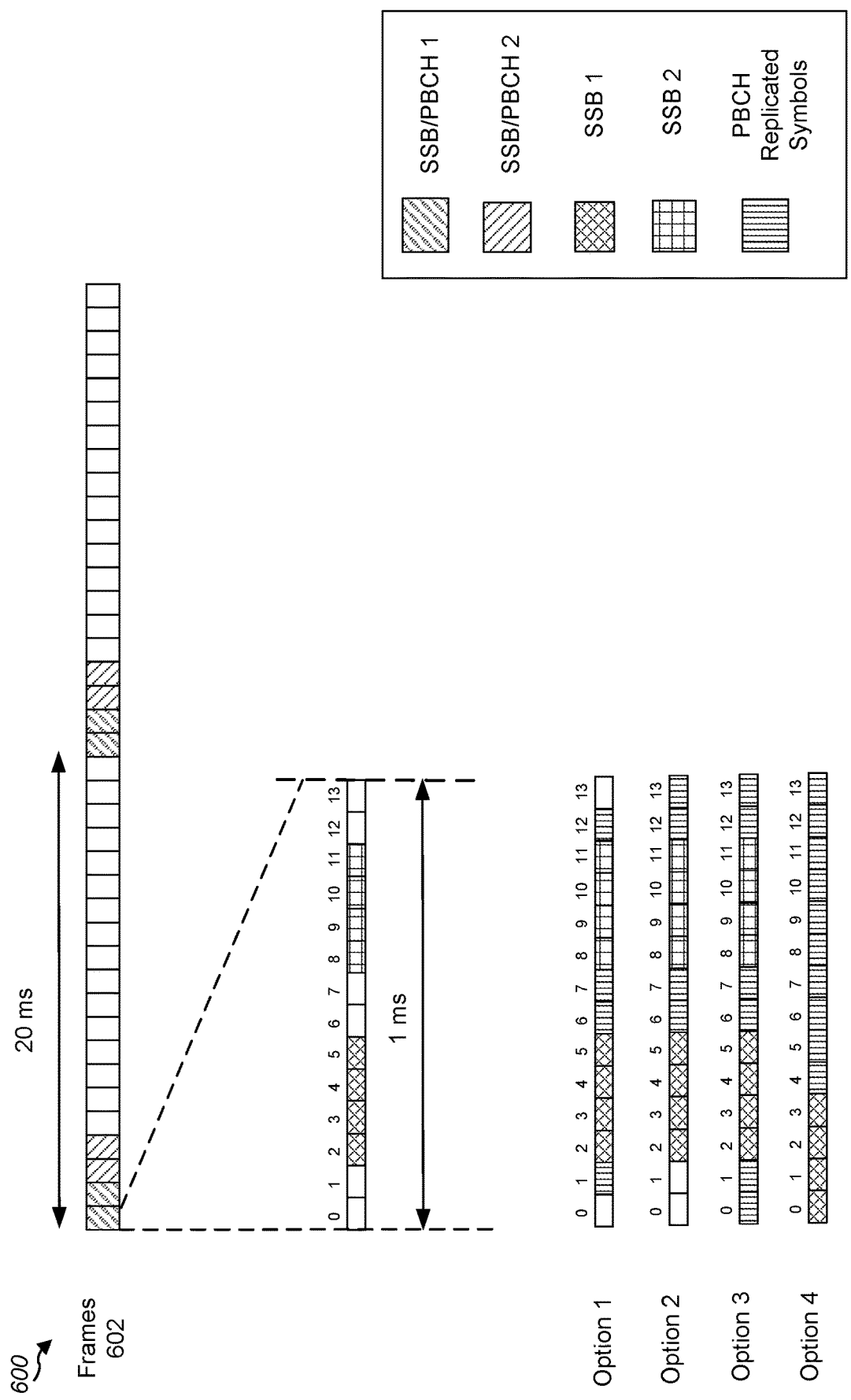
FIG. 6 illustrates examples of allocation of time resources to SSBs and replicated PBCHs, according to one or more aspects.

FIG. 5 illustrates examples of allocation of time resources to SSBs and additional PBCHs. The SSBs and PBCHs are allocated for each frame (e.g., ten subframes each having a duration of 1 ms) of frames 502, and a maximum number of SSBs in an SSB period (e.g., a frame) is given by a value of Lmax. In some implementations, Lmax can be either 4 or 8. In some implementations, the SSBs and PBCHs described with reference to FIG. 5 correspond to a subcarrier spacing of 30 KHz, and in such implementations, each sub-frame includes two slots having durations of 0.5 ms. In the example shown in a greater detail in FIG. 5, Lmax is 4. If Lmax is 8, the allocations shown in the first four slots may be repeated in the next four slots of each frame.

FIG. 5 illustrates example allocation of additional PBCH resources for two SSB repetition patterns. A first SSB repetition pattern 520 (referred to in some wireless communication standard specifications as "Pattern C") includes allocation of two SSBs to each slot, separated in time by two OFDM symbols. For example, within a first slot, a first SSB ("SSB 1") may be allocated the third-sixth OFDM symbols (labeled OFDM symbols 2-5 in FIG. 5) and a second SSB ("SSB 2") may be allocated to the ninth-twelfth OFDM symbols (labeled OFDM symbols 8-11 in FIG. 5). In the first pattern 520, the resources allocated to additional PBCHs may be positioned subsequent to the resources allocated to the corresponding SSBs. For example, additional PBCH may be allocated to the seventh and eighth OFDM symbols (e.g., labeled OFDM 6 and 7 in FIG. 5), which are the OFDM symbols subsequent to the OFDM symbols allocated to SSB1. Similarly, within the same time slot, additional PBCH may be allocated to the thirteenth and fourteenth OFDM symbols (e.g., labeled OFDM 12 and 13 in FIG. 5), which are the OFDM symbols subsequent to the OFDM symbols allocated to SSB2. This pattern may be repeated in the second slot if Lmax is 4, or in the second, third, and fourth slots, if Lmax is 8. The third and fourth slots are labeled SSB/PBCH 2 in FIG. 5.

A second SSB repetition pattern 530 (which may be referred to in some wireless communication standard specifications as "Pattern B") includes allocation of two SSBs to different OFDM symbols of adjacent slots. For example, within a first slot, SSB 1 may be allocated the fifth-eighth OFDM symbols (labeled OFDM symbols 4-7 in FIG. 5) and SSB 2 may be allocated the ninth-twelfth OFDM symbols (labeled OFDM symbols 8-11 in FIG. 5). Within a second slot, SSB 1 may be allocated the third-sixth OFDM symbols (labeled OFDM symbols 2-5 in FIG. 5) and SSB 2 may be allocated the seventh-tenth OFDM symbols (labeled OFDM symbols 6-9 in FIG. 5). In the second SSB repetition pattern 530, the resources allocated to the additional PBCH corresponding to SSB 1 may precede the resources allocated to SSB 1, whereas the resources allocated to the additional PBCH corresponding to SSB 2 may be subsequent to the resources allocated to SSB 2. For example, within the first slot, the additional PBCH corresponding to SSB 1 may be allocated the third and fourth OFDM symbols (labeled OFDM symbols 2 and 3 in FIG. 5), which precede the resources allocated to SSB 1, and the additional PBCH corresponding to SSB 2 may be allocated to the thirteenth and fourteenth OFDM symbols (e.g., labeled OFDM symbols 12 and 13 in FIG. 5), which are subsequent to the resources allocated to SSB 2. Within the second slot, the additional PBCH corresponding to SSB 1 may be allocated the first and second OFDM symbols (labeled OFDM symbols 0 and 1 in FIG. 5), which precede the resources allocated to SSB 1, and the additional PBCH corresponding to SSB 2 may be allocated to the eleventh and twelfth OFDM symbols (e.g., labeled OFDM symbols 10 and 11 in FIG. 5), which are subsequent to the resources allocated to SSB 2.

A second option 525 shown in FIG. 5 corresponds to the first SSB repetition pattern 520, but with different resources allocated to the additional PBCHs. To illustrate, in each of the slots, one of the resources allocated to the additional PBCH may precede the resources allocated to the corresponding SSB and another one of the resources allocated to the additional PBCH may be subsequent to the resources allocated to the corresponding SSB. For example, within each time slot of the SSB period, SSB 1 may be allocated to the third-sixth OFDM symbols and a corresponding additional PBCH may be allocated to the second OFDM symbol and the seventh OFDM symbol. Similarly, SSB 2 may be allocated to the ninth-twelfth OFDM symbols and a corresponding additional PBCH may be allocated to the eighth OFDM symbol and the thirteenth OFDM symbol.

FIG. 6 illustrates examples of allocation of time resources to SSBs and replicated PBCHs. The SSBs and PBCHs are allocated for each frame (e.g., ten subframes each having a duration of 1 ms) of frames 602, and a maximum number of SSBs in an SSB period (e.g., a frame) is again dependent on a value of Lmax. In some implementations, Lmax can be either 2, 4, or 8. In some implementations, the SSBs and PBCHs described with reference to FIG. 6 correspond to a subcarrier spacing of 15 KHz, and in such implementations, each sub-frame includes one slot having a duration of 1 ms. In the first three options (i.e., Options 1-3) shown in a greater detail in FIG. 6, Lmax is 4. In the last option, i.e., Option 4, Lmax is 2. If Lmax is 8, the allocations shown in the first four slots may be repeated in the next four slots of each frame.

Options 1-3 of FIG. 6 illustrate example allocation of replicated PBCH resources for a particular SSB repetition pattern. The SSB repetition pattern in Options 1-3 includes allocation of two SSBs to each slot, separated in time by two OFDM symbols. For example, within a first slot, a first SSB ("SSB 1") may be allocated the third-sixth OFDM symbols (labeled OFDM symbols 2-5 in FIG. 6) and a second SSB ("SSB 2") may be allocated to the ninth-twelfth OFDM symbols (labeled OFDM symbols 8-11 in FIG. 6). In Option 1, one of the resources allocated to the replicated PBCH may precede the resources allocated to the corresponding SSB and another one of the resources allocated to the replicated PBCH may be subsequent to the resources allocated to the corresponding SSB. For example, within each time slot of the SSB period, SSB 1 may be allocated to the third-sixth OFDM symbols and a corresponding replicated PBCH may be allocated to the second OFDM symbol and the seventh OFDM symbol (e.g., labeled OFDM 1 and 6, respectively). Similarly, SSB 2 may be allocated to the ninth-twelfth OFDM symbols and a corresponding replicated PBCH may be allocated to the eighth OFDM symbol and the thirteenth OFDM symbol (e.g., labeled OFDM 7 and 12, respectively). This pattern may be repeated in the second slot if Lmax is 4, or in the second, third, and fourth slots, if Lmax is 8.

In Option 2, the resources allocated to the replicated PBCHs may be positioned subsequent to the resources allocated to the corresponding SSBs. For example, replicated PBCH may be allocated to the seventh and eighth OFDM symbols (e.g., labeled OFDM 6 and 7 in FIG. 6), which are the OFDM symbols subsequent to the OFDM symbols allocated to SSB1. Similarly, within the same time slot, the replicated PBCHs may be allocated to the thirteenth and fourteenth OFDM symbols (e.g., labeled OFDM 12 and 13 in FIG. 6), which are the OFDM symbols subsequent to the OFDM symbols allocated to SSB2. This pattern may be repeated in the second slot if Lmax is 4, or in the second, third, and fourth slots, if Lmax is 8.

In Option 3, instead of two time resources, three time resources may be allocated to the replicated PBCHs for the corresponding SSBs. In such implementations, some of the resources allocated to the replicated PBCHs may precede the resources allocated to the corresponding SSBs, while other resources allocated to the replicated PBCHs may be positioned subsequent to the resources allocated to the corresponding SSBs. For example, replicated PBCH may be allocated to the first and second OFDM symbols (e.g., labeled OFDM 0 and 1 in FIG. 6), which are the OFDM symbols preceding to the OFDM symbols allocated to SSB1, and to the seventh OFDM symbol (e.g., labeled OFDM 6), which is the OFDM symbol subsequent to the OFDM symbols allocated to SSB1. Similarly, within the same time slot, PBCH may be allocated to the eighth OFDM symbol (e.g., labeled OFDM 7), which is the OFDM symbol preceding to the OFDM symbols allocated to SSB2, and to the thirteenth and fourteenth OFDM symbols (e.g., labeled OFDM 12 and 13 in FIG. 6), which are the OFDM symbols subsequent to the OFDM symbols allocated to SSB2. This pattern may be repeated in the second slot if Lmax is 4, or in the second, third, and fourth slots, if Lmax is 8.

Option 4 in FIG. 6 illustrates an example allocation of replicated PBCH resources for implementations where a single SSB is allocated resources in a slot. For example, within a first slot, SSB 1 may be allocated the first-fourth OFDM symbols (labeled OFDM symbols 0-4 in FIG. 6). In such implementations, the resources allocated to the replicated PBCH may be allocated rest of the resources subsequent to the resources allocated to the corresponding SSB. For example, within each time slot of the SSB period, SSB 1 may be allocated to the first-fourth OFDM symbols and a corresponding replicated PBCH may be allocated to the fifth-fourteenth OFDM symbols (e.g., labeled OFDM 4-14). In other implementations, the replicated PBCH may be allocated to fewer than all of the remaining OFDM symbols (e.g., fewer than all of OFDM symbols 4-14).

Figure 7:
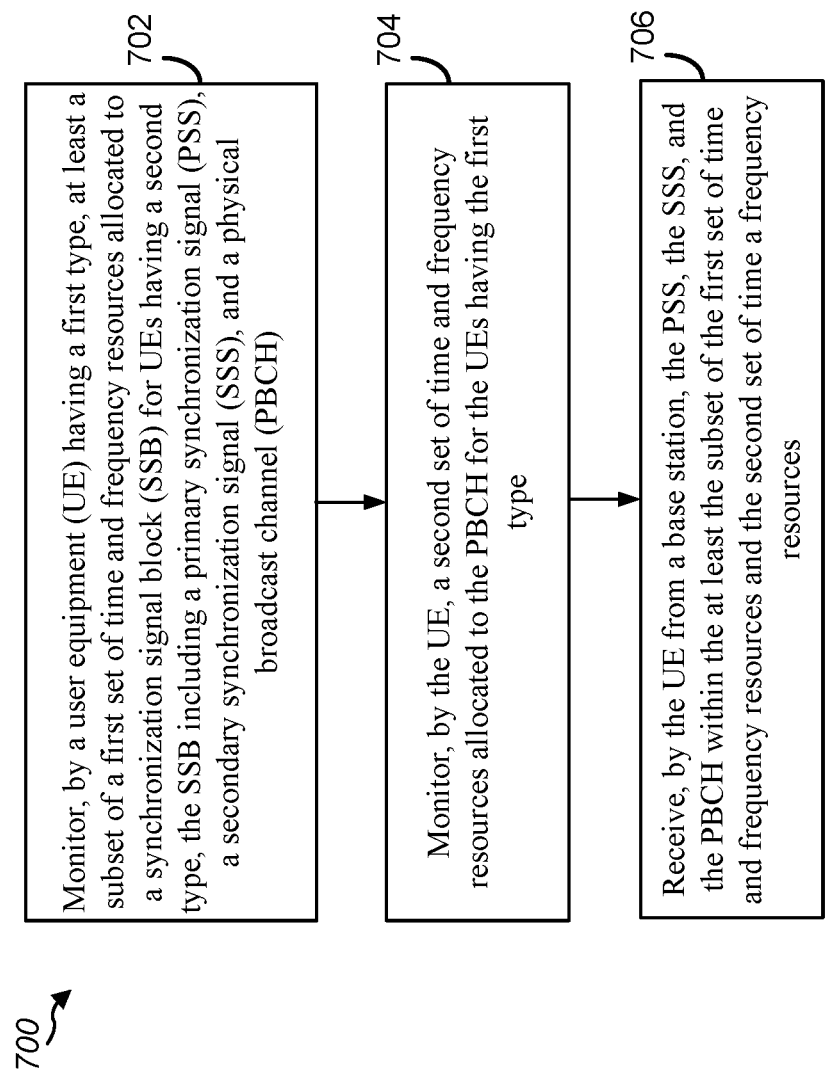
FIG. 7 is a flow diagram illustrating an example process that supports allocation of resources for a PBCH for reduced bandwidth devices according to one or more aspects.

FIG. 7 is a flow diagram illustrating an example process 700 that supports allocation of resources for a PBCH for reduced bandwidth devices according to one or more aspects. Operations of the process 700 may be performed by a UE, such as the UE 115 described above with reference to FIG. 1, 2, 4, or a UE described with reference to FIG. 8. For example, example operations (also referred to as "blocks") of the process 700 may enable the UE 115 to support allocation of time and frequency resources for a PBCH for reduced bandwidth devices.

In block 702, the UE 115, which has a first type (e.g., reduced bandwidth devices associated with communications within a 5 MHz bandwidth) monitors at least a subset of a first set of time and frequency resources allocated to a SSB for UEs having a second type (e.g., non-reduced bandwidth devices associated with communications over the 5 MHz bandwidth). For example, the subset of a first set of time and frequency resources may include or correspond to some of the resources indicated by the SSB resource allocation data 406 of FIG. 4. In some implementations, the first set of time and frequency resources may cover a bandwidth that is greater than 5 MHz. Additionally or alternatively, the SSB may include a PSS, an SSS, and a PBCH. For example, the PSS may include or correspond to the PSS 472 of FIG. 4, the SSS may include or correspond to the SSS 474 of FIG. 4, and the PBCH may include or correspond to the PBCH 476 of FIG. 4.

In block 704, the UE 115 may monitor a second set of time and frequency resources allocated to the PBCH for the UEs having the first type. For example, the second set of time and frequency resources may include or correspond to other resources indicated by the SSB resource allocation data 406 of FIG. 4. In some implementations, the frequency resources of the second set of time and the frequency resources overlap with frequency resources of the subset of the first set of time and frequency resources. For example, as described with reference to FIG. 3B, the additional PBCH 322 may occupy frequency resources (e.g., a range of 12 PRBs) that overlap with frequency resources (e.g., the same range of 12 PRBs) of the first set of time and frequency resources associated with the PBCH 312. In such implementations, the time resources of the second set of time and frequency resources are different from time resources of the subset of the first set of time and frequency resources. For example, with reference to FIG. 3B, the first set of time and frequency resources may include the first-fourth OFDM symbols that are different from the fifth and sixth OFDM symbols included in the second set of time and frequency resources. In block 706, the UE may receive, from a base station, the PSS, the SSS, and the PBCH within the at least the subset of the first set of time and frequency resources and the second set of time and frequency resources. For example, with reference to FIG. 4, the PSS 472 and the SSS 474 may be received via the first set of time and frequency resources, and the additional or replicated PBCH 478 may be received via the subset of the first set of time and frequency resources and the second set of time and frequency resources.

In some implementations, the process 700 may include determining the subset of the first set of time and frequency resources, the second set of time and frequency resources, an SSB pattern, PBCH repetition information, or a combination thereof, based on a preconfigured SSB allocation stored at the UE. For example, in some implementations, the SSB resource allocation data 406 of FIG. 4 may be preconfigured (e.g., pre-stored or predefined) at the UE 115. Alternatively, the process 700 may include receiving an initial message that indicates an SSB allocation that includes at least the subset of the first set of time and frequency resources, the second set of time and frequency resources, an SSB pattern, PBCH repetition information, or a combination thereof. For example, in some implementations, the initial message 470 of FIG. 4 may include the SSB resource allocation data 406.

In some implementations, the SSB is associated with a sub-carrier spacing of 30 KHz, and the monitoring the at least the subset of the first set of time and frequency resources includes monitoring the subset of the first set of time and frequency resources. For example, with reference to FIG. 3B, the at least the subset of the first set of time and frequency resources may include the first-fourth OFDM symbols and a frequency range of 20 PRBs. This includes monitoring the subset of the first set of time and frequency resources, which may include first-fourth OFDM symbols and a frequency range of 12 PRBs. Further, with reference to FIG. 3B, the first set of time and frequency resources may include first-fourth symbols in the time domain and 20 PRBs in the frequency domain.

In some implementations, the second set of time and frequency resources may include two OFDM symbols in the time domain and the twelve PRBs in the frequency domain. For example, with reference to FIG. 3B, the UE 115 may monitor a second set of time and frequency resources allocated to the additional PBCH 322, which may occupy fifth and sixth OFDM symbols and 12 PRBs in the frequency domain. In some implementations, the second set of time and frequency resources includes two OFDM symbols following the four OFDM symbols of the first set of time and frequency resources. For example, with reference to FIG. 5, the resources allocated to additional PBCHs (e.g., labeled OFDM symbols 6 and 7) may be positioned subsequent to the resources allocated to the corresponding SSBs (e.g., labeled OFDM symbols 2-5). In some implementations, the second set of time and frequency resources includes a first OFDM symbol before the four OFDM of the first set of time and frequency resources and a second OFDM symbol following the four OFDM symbols of the first set of time and frequency resources. For example, with reference to FIG. 5, within a first slot, the additional PBCH corresponding to SSB 1 may be allocated the third and fourth OFDM symbols (labeled OFDM symbols 2 and 3), which precede the resources allocated to SSB 1, and the additional PBCH corresponding to SSB 2 may be allocated to the thirteenth and fourteenth OFDM symbols (e.g., labeled OFDM symbols 12 and 13), which are subsequent to the resources allocated to SSB 2. In some implementations, the second set of time and frequency resources includes two OFDM symbols before the four OFDM symbols of the first set of time and frequency resources based on the four OFDM symbols of the first set of time and frequency resources including the fifth through eighth OFDM symbols of a slot; or two OFDM symbols following four OFDM symbols of the first set of time and frequency resources based on the four OFDM symbols of the first set of time and frequency resources including the ninth through twelfth OFDM symbols of a slot. For example, with reference to FIG. 5, a first SSB repetition pattern 520 includes allocation of two SSBs to each slot, separated in time by two OFDM symbols. To illustrate, within a first slot, SSB 1 may be allocated the third-sixth OFDM symbols (labeled OFDM symbols 2-5) and a SSB 2 may be allocated to the ninth-twelfth OFDM symbols (labeled OFDM symbols 8-11).

In some implementations, the SSB is associated with a sub-carrier spacing of 15 KHz, and the monitoring the at least the subset of the first set of time and frequency resources includes monitoring an entirety of the first set of time and frequency resources. For example, with reference to FIG. 3C, the at least the subset of the first set of time and frequency resources may include the first-fourth OFDM symbols and a frequency range of 24 PRBs. This includes monitoring entirety of the first set of time and frequency resources, which may include first-fourth OFDM symbols and a frequency range of 24 PRBs. Further, with reference to FIG. 3C, the first set of time and frequency resources may include first-fourth symbols in the time domain and 24 PRBs in the frequency domain.

In some implementations in which the sub-carrier spacing is 15 KHz, the second set of time and frequency resources includes a first OFDM symbol before the four OFDM symbols of the first set of time and frequency resources and a second OFDM symbol following the four OFDM symbols of the first set of time and frequency resources. For example, with reference to Option 1 of FIG. 6, within each time slot of the SSB period, SSB 1 may be allocated to the third-sixth OFDM symbols and a corresponding replicated PBCH may be allocated to the second OFDM symbol and the seventh OFDM symbol (e.g., labeled OFDM 1 and 6, respectively). Alternatively, the second set of time and frequency resources may include two OFDM symbols following the four OFDM symbols of the first set of time and frequency resources. For example, with reference to Option 2 of FIG. 6, the replicated PBCH may be allocated to the seventh and eighth OFDM symbols (e.g., labeled OFDM 6 and 7 in FIG. 6), which are the OFDM symbols subsequent to the OFDM symbols allocated to SSB1. Alternatively, the second set of time and frequency resources may include two OFDM symbols before the four OFDM symbols of the first set of time and frequency resources and one OFDM symbol following the four OFDM symbols of the first set of time and frequency resources. For example, with reference to Option 3 of FIG. 6, some replicated PBCHs may be allocated to the first and second OFDM symbols (e.g., labeled OFDM 0 and 1 in FIG. 6), which are the OFDM symbols preceding to the OFDM symbols allocated to SSB1, and other replicated PBCHs may be allocated to the seventh OFDM symbol (e.g., labeled OFDM 6), which is the OFDM symbol subsequent to the OFDM symbols allocated to SSB1. Alternatively, the SSB may be the only SSB allocated to a slot, and the second set of time and frequency resources may include eight OFDM symbols following the four OFDM symbols of the first set of time and frequency resources. For example, with reference to Option 4 of FIG. 6, within a first slot, SSB 1 may be allocated the first-fourth OFDM symbols (labeled OFDM symbols 0-4 in FIG. 6), and within each time slot of the SSB period, SSB 1 may be allocated to the first-fourth OFDM symbols and a corresponding replicated PBCH may be allocated to the fifth-fourteenth OFDM symbols (e.g., labeled OFDM 4-14).

Figure 8:
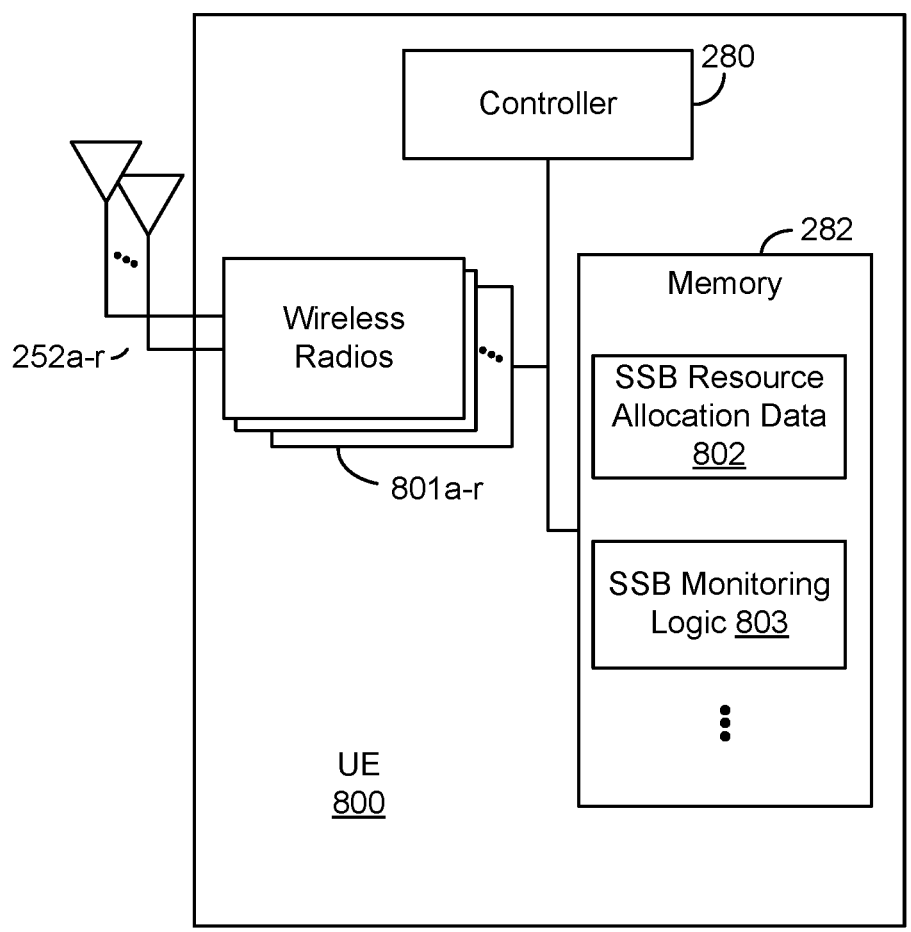
FIG. 8 is a block diagram of an example user equipment (UE) that supports allocation of resources for a PBCH for reduced bandwidth devices according to one or more aspects.

FIG. 8 is a block diagram of an example UE 800 that supports allocation of resources for a PBCH for reduced bandwidth devices according to one or more aspects. The UE 800 may be configured to perform operations, including the blocks of the process 700 described with reference to FIG. 7. In some implementations, the UE 800 includes the structure, hardware, and components shown and described with reference to the UE 115 of FIGS. 1, 2, and 4. For example, the UE 800 includes the controller 280, which operates to execute logic or computer instructions stored in the memory 282, as well as controlling the components of the UE 800 that provide the features and functionality of the UE 800. The UE 800, under control of the controller 280, transmits and receives signals via wireless radios 801*a-r* and the antennas 252*a-r*. The wireless radios 801*a-r* include various components and hardware, as illustrated in FIG. 2 for the UE 115, including the modulator and demodulators 254*a-r*, the MIMO detector 256, the receive processor 258, the transmit processor 264, and the TX MIMO processor 266.

Figure 10:
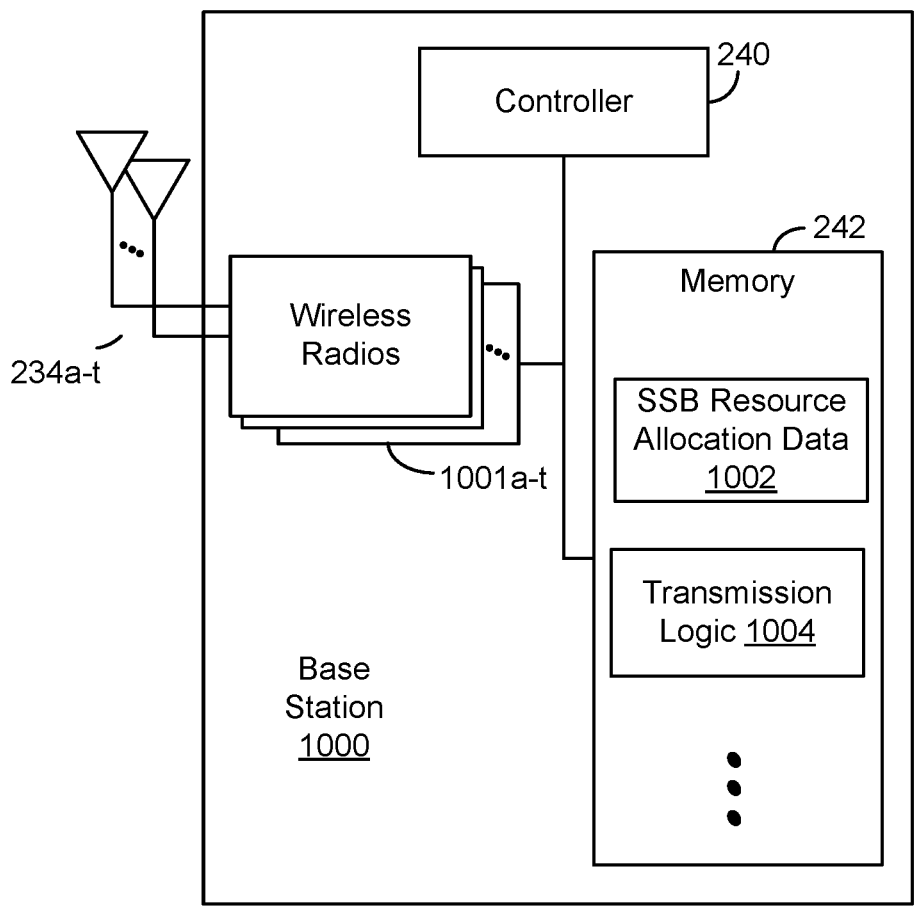
FIG. 10 is a block diagram of an example base station that supports allocation of resources for a PBCH for reduced bandwidth devices according to one or more aspects.

As shown, the memory 282 may include SSB resource allocation data 802 and SSB monitoring logic 803. The SSB resource allocation data 802 may include or correspond to the SSB resource allocation data 406 of FIG. 4. The SSB monitoring logic 803 may monitor one or more sets of time and frequency resources based on the SSB resource allocation data 802 to receive one or more signals or messages from a base station, such as a PSS, an SSS, and a PBCH. The UE 800 may receive signals from or transmit signals to one or more network entities, such as the base station 105 of FIGS. 1, 2, and 4 or a base station as illustrated in FIG. 10.

Figure 9:
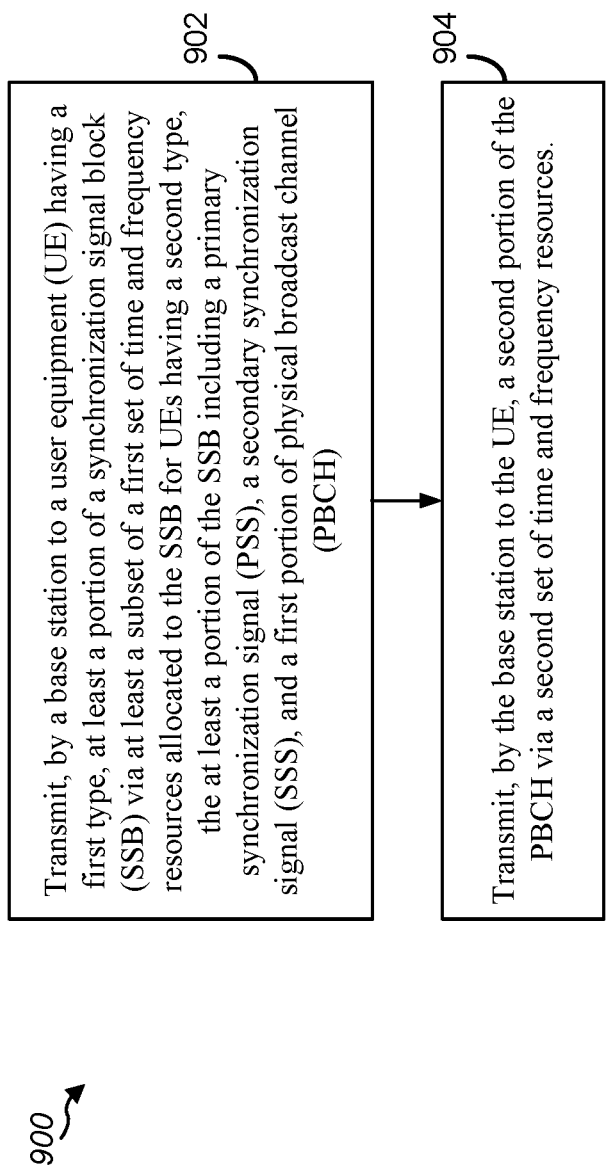
FIG. 9 is a flow diagram illustrating an example process that supports allocation of resources for a PBCH for reduced bandwidth devices according to one or more aspects.

FIG. 9 is a flow diagram illustrating an example process 900 that supports allocation of resources for a PBCH for reduced bandwidth devices according to one or more aspects. Operations of the process 900 may be performed by a base station, such as the base station 105 described above with reference to FIG. 1, 2, 4 or a base station as described with reference to FIG. 10. For example, example operations of process 900 may enable the base station 105 to support allocation of resources for a PBCH for reduced bandwidth devices according to one or more aspects.

At block 902, the base station transmits to a UE having a first type, at least a portion of an SSB via at least a subset of a first set of time and frequency resources allocated to the SSB for UEs having a second type. For example, the at least a subset of a first set of time and frequency resources may include or correspond to some of the resources indicated by the SSB resource allocation data 406 of FIG. 4. In some implementations, the first set of time and frequency resources may cover a bandwidth that is greater than 5 MHz. Additionally or alternatively, the SSB may include a PSS, an SSS, and a PBCH. For example, the PSS may include or correspond to the PSS 472 of FIG. 4, the SSS may include or correspond to the SSS 474 of FIG. 4, and the PBCH may include or correspond to the PBCH 476 of FIG. 4.

At block 904, the base station transmits a second portion of the PBCH via a second set of time and frequency resources. For example, the second set of time and frequency resources may include or correspond to other resources indicated by the SSB resource allocation data 406 of FIG. 4. In some implementations, the frequency resources of the second set of time and the frequency resources overlap with frequency resources of the subset of the first set of time and frequency resources. For example, as described with reference to FIG. 3B, the additional PBCH 322 may occupy frequency resources (e.g., a range of 12 PRBs) that overlap with frequency resources (e.g., the same range of 12 PRBs) of the first set of time and frequency resources associated with the PBCH 312. In such implementations, the time resources of the second set of time and frequency resources are different from time resources of the subset of the first set of time and frequency resources.

In some implementations, the process 900 may include transmitting, by the base station to the UE, an initial message that indicates an SSB allocation that includes at least the subset of the first set of time and frequency resources, the second set of time and frequency resources, an SSB pattern, PBCH repetition information, or a combination thereof. For example, the initial message 470 of FIG. 4 may include the SSB resource allocation data 406.

FIG. 10 is a block diagram of an example base station 1000 that supports allocation of resources for a PBCH for reduced bandwidth devices according to one or more aspects. The base station 1000 may be configured to perform operations, including the blocks of the process 900 described with reference to FIG. 9. In some implementations, base station 1000 includes the structure, hardware, and components shown and described with reference to the base station 105 of FIGS. 1, 2, and 4. For example, the base station 1000 may include the controller 240, which operates to execute logic or computer instructions stored in the memory 242, as well as controlling the components of the base station 1000 that provide the features and functionality of the base station 1000. The base station 1000, under control of the controller 240, transmits and receives signals via wireless radios 1001*a-t* and the antennas 234*a-t*. The wireless radios 1001*a-t* include various components and hardware, as illustrated in FIG. 2 for the base station 105, including the modulator and demodulators 232*a-t*, the transmit processor 220, the TX MIMO processor 230, the MIMO detector 236, and the receive processor 238.

As shown, the memory 242 may include SSB resource allocation data 1002 and transmission logic 1004. The SSB resource allocation data 1002 may include or correspond to the SSB resource allocation data 406 of FIG. 4. The transmission logic 1004 may be configured to transmit signals and messages based on the SSB resource allocation data 1002. The base station 1000 may receive signals from or transmit signals to one or more UEs, such as the UE 115 of FIG. 1, 2, 4 or the UE 800 of FIG. 8.

It is noted that one or more blocks (or operations) described with reference to FIGS. 7 and 9 may be combined with one or more blocks (or operations) described with reference to another of the figures. For example, one or more blocks (or operations) of FIG. 7 may be combined with one or more blocks (or operations) of FIG. 9 As another example, one or more blocks associated with FIG. 7 or 9 may be combined with one or more blocks (or operations) associated with FIGS. 1, 2, and 4. Additionally, or alternatively, one or more operations described above with reference to FIGS. 1-7 and 9 may be combined with one or more operations described with reference to FIG. 8 or 10.

In one or more aspects, techniques for supporting allocation of resources for a PBCH for reduced bandwidth devices may include additional aspects, such as any single aspect or any combination of aspects described below or in connection with one or more other processes or devices described elsewhere herein. In a first aspect, supporting allocation of resources for a PBCH for reduced bandwidth devices may include an apparatus having a first type and configured to monitor at least a subset of a first set of time and frequency resources allocated to an SSB for UEs having a second type. The SSB includes a PSS, an SSS, and a PBCH. The apparatus is also configured to monitor a second set of time and frequency resources allocated to the PBCH for the UEs having the first type. The apparatus is further configured to receive, from a base station, the PSS, the SSS, and the PBCH within the at least the subset of the first set of time and frequency resources and the second set of time and frequency resources. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, frequency resources of the second set of time and frequency resources overlap with frequency resources of the subset of the first set of time and frequency resources. Time resources of the second set of time and frequency resources are different from time resources of the subset of the first set of time and frequency resources.

In a third aspect, in combination with one or more of the first aspect or the second aspect, the apparatus is associated with communications within a 5 MHz bandwidth. The first set of time and frequency resources cover a bandwidth that is greater than 5 MHz.

In a fourth aspect, in combination with one or more of the first aspect through the third aspect, the apparatus is configured to determine the subset of the first set of time and frequency resources, the second set of time and frequency resources, an SSB pattern, PBCH repetition information, or a combination thereof, based on a preconfigured SSB allocation stored at the apparatus.

In a fifth aspect, in combination with one or more of the first aspect through the third aspect, the apparatus is configured to receive, from the base station, an initial message that indicates SSB allocation that includes at least the subset of the first set of time and frequency resources, the second set of time and frequency resources, an SSB pattern, PBCH repetition information, or a combination thereof.

In a sixth aspect, in combination with one or more of the first aspect through the fifth aspect, monitoring the at least the subset of the first set of time and frequency resources includes monitoring the subset of the first set of time and frequency resources. The SSB is associated with a sub-carrier spacing of 30 KHz. The first set of time and frequency resources includes four OFDM symbols in the time domain and twenty PRBs in the frequency domain. The subset of the first set of time and frequency resources includes the four OFDM symbols in the time domain and twelve PRBs of the twenty PRBs in the frequency domain. The second set of time and frequency resources includes two OFDM symbols in the time domain and the twelve PRBs in the frequency domain.

In a seventh aspect, in combination with the sixth aspect, the second set of time and frequency resources includes two OFDM symbols following the four OFDM symbols of the first set of time and frequency resources.

In an eighth aspect, in combination with the sixth aspect, the second set of time and frequency resources includes a first OFDM symbol before the four OFDM symbols of the first set of time and frequency resources and a second OFDM symbol following the four OFDM symbols of the first set of time and frequency resources.

In a ninth aspect, in combination with the sixth aspect, the second set of time and frequency resources includes two OFDM symbols before the four OFDM symbols of the first set of time and frequency resources based on the four OFDM symbols of the first set of time and frequency resources including the fifth through eighth OFDM symbols of a slot, or the second set of time and frequency resources includes two OFDM symbols following four OFDM symbols of the first set of time and frequency resources based on the four OFDM symbols of the first set of time and frequency resources including the ninth through twelfth OFDM symbols of a slot.

In a tenth aspect, in combination with one or more of the first aspect through the fifth aspect, monitoring the at least the subset of the first set of time and frequency resources includes monitoring an entirety of the first set of time and frequency resources. The SSB is associated with a sub-carrier spacing of 15 KHz and PBCH repetition. The first set of time and frequency resources includes four OFDM symbols in the time domain and twenty-four PRBs in the frequency domain. The second set of time and frequency resources includes two OFDM symbols in the time domain and the twenty-four PRBs in the frequency domain.

In an eleventh aspect, in combination with the tenth aspect, the second set of time and frequency resources includes a first OFDM symbol before the four OFDM symbols of the first set of time and frequency resources and a second OFDM symbol following the four OFDM symbols of the first set of time and frequency resources.

In a twelfth aspect, in combination with the tenth aspect, the second set of time and frequency resources includes two OFDM symbols following the four OFDM symbols of the first set of time and frequency resources.

In a thirteenth aspect, in combination with the tenth aspect, the second set of time and frequency resources includes two OFDM symbols before the four OFDM symbols of the first set of time and frequency resources and one OFDM symbol following the four OFDM symbols of the first set of time and frequency resources.

In a fourteenth aspect, in combination with the tenth aspect, the SSB is the only SSB allocated to a slot. The second set of time and frequency resources includes eight OFDM symbols following the four OFDM symbols of the first set of time and frequency resources.

In a fifteenth aspect, in combination with one or more of the tenth aspect through the fourteenth aspect, the apparatus is further configured to determine a cell identifier associated with the base station based on the PSS and the SSS and to determine whether PBCH repetition is configured based on the cell identifier.

In a sixteenth aspect, supporting allocation of resources for a PBCH for reduced bandwidth devices may include an apparatus configured to transmit, to a UE having a first type, at least a portion of a SSB via at least a subset of a first set of time and frequency resources allocated to the SSB for UEs having a second type. The at least a portion of the SSB includes a PSS, an SSS, and a first portion of a PBCH. The apparatus is further configured to transmit, to the UE, a second portion of the PBCH via a second set of time and frequency resources. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a seventeenth aspect, in combination with the sixteenth aspect, frequency resources of the second set of time and frequency resources overlap with frequency resources of the subset of the first set of time and frequency resources. Time resources of the second set of time and frequency resources are different from time resources of the subset of the first set of time and frequency resources.

In an eighteenth aspect, in combination with one or more of the sixteenth aspect through the seventeenth aspect, the UE having the first type is associated with communications within a 5 MHz bandwidth. The first set of time and frequency resources cover a bandwidth that is greater than 5 MHz.

In a nineteenth aspect, in combination with one or more of the sixteenth aspect through the seventeenth aspect, the apparatus is configured to transmit, to the UE, an initial message that indicates an SSB allocation that includes at least the subset of the first set of time and frequency resources, the second set of time and frequency resources, an SSB pattern, PBCH repetition information, or a combination thereof.

In a twentieth aspect, in combination with one or more of the sixteenth aspect through the nineteenth aspect, transmitting the at least the portion of the SSB via the at least the subset of the first set of time and frequency resources includes transmitting the at least the portion of the SSB via the subset of the first set of time and frequency resources. The SSB is associated with a sub-carrier spacing of 15 KHz. The first set of time and frequency resources includes four OFDM symbols in the time domain and twenty PRBs in the frequency domain. The subset of the first set of time and frequency resources includes four OFDM symbols in the time domain and twelve PRBs of the twenty PRBs in the frequency domain. The second set of time and frequency resources includes two OFDM symbols in the time domain and the twenty PRBs in the frequency domain.

In a twenty-first aspect, in combination with the twentieth aspect, the second set of time and frequency resources includes two OFDM symbols following the four OFDM symbols of the first set of time and frequency resources.

In a twenty-second aspect, in combination with the twentieth aspect, the second set of time and frequency resources includes a first OFDM symbol before the four OFDM symbols of the first set of time and frequency resources and a second OFDM symbol following the four OFDM symbols of the first set of time and frequency resources.

In a twenty-third aspect, in combination with the twentieth aspect, the second set of time and frequency resources includes two OFDM symbols before the four OFDM symbols of the first set of time and frequency resources based on the four OFDM symbols of the first set of time and frequency resources including the fifth through eighth OFDM symbols of a slot, or the second set of time and frequency resources includes two ODFM symbols following the four OFDM symbols of the first set of time and frequency resources based on the four OFDM symbols of the first set of time and frequency resources including the ninth through twelfth OFDM symbols of a slot.

In a twenty-fourth aspect, in combination with one or more of the sixteenth aspect through the nineteenth aspect, transmitting the at least the portion of the SSB via the at least the subset of the first set of time and frequency resources includes transmitting the at least the portion of the SSB via an entirety of the first set of time and frequency resources. The SSB is associated with a sub-carrier spacing of 15 KHz and PBCH repetition. The first set of time and frequency resources includes four OFDM symbols in the time domain and twenty-four PRBs in the frequency domain. The second set of time and frequency resources includes two OFDM symbols in the time domain and the twenty-four PRBs in the frequency domain.

In a twenty-fifth aspect, in combination with the twenty-fourth aspect, the second set of time and frequency resources includes a first OFDM symbol before the four OFDM symbols of the first set of time and frequency resources and a second OFDM symbol following the four OFDM symbols of the first set of time and frequency resources.

In a twenty-sixth aspect, in combination with the twenty-fourth aspect, the second set of time and frequency resources includes two OFDM symbols following the four OFDM symbols of the first set of time and frequency resources.

In a twenty-seventh aspect, in combination with the twenty-fourth aspect, the second set of time and frequency resources includes two OFDM symbols before the four OFDM symbols of the first set of time and frequency resources and one OFDM symbol following the four OFDM symbols of the first set of time and frequency resources.

In a twenty-eighth aspect, in combination with one or more of the twenty-fourth aspect through the twenty-seventh aspect, the PSS and the SSS indicate a cell identifier. The cell identifier indicates whether PBCH repetition is to be configured at the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a user equipment (UE) having a first type, the method comprising:
   receiving, from a base station, an initial message that indicates a synchronization signal block (SSB) allocation that includes at least a subset of a first set of time and frequency resources for UEs having a second type, a second set of time and frequency resources allocated to a physical broadcast channel (PBCH) for UEs having the first type, and PBCH repetition information;
   monitoring at least the subset of the first set of time and frequency resources allocated to the SSB, the SSB including a primary synchronization signal (PSS), a secondary synchronization signal (SSS), and the PBCH, wherein the first set of time and frequency resources including four orthogonal frequency division multiplexing (OFDM) symbols in a time domain;
   monitoring the second set of time and frequency resources allocated to the PBCH for the UEs having the first type, the second set of time and frequency resources including two OFDM symbols in the time domain and the second set of time and frequency resources allocated to repetition of a portion of the PBCH that is allocated to frequency resources that are outside the subset of the first set of time and frequency resources, the repetition of the portion of the PBCH indicated by the PBCH repetition information; and
   receiving, by the UE from a base station, the PSS, the SSS, and the PBCH within the at least the subset of the first set of time and frequency resources and the second set of time and frequency resources.

2. The method of claim 1, wherein frequency resources of the second set of time and frequency resources overlap with frequency resources of the subset of the first set of time and frequency resources, and wherein time resources of the second set of time and frequency resources are different from time resources of the subset of the first set of time and frequency resources.

3. The method of claim 1, wherein the UE having the first type is associated with communications within a 5 megahertz (MHz) bandwidth, and wherein the first set of time and frequency resources cover a bandwidth that is greater than 5 MHz.

4. The method of claim 1, wherein the SSB allocation further includes an SSB pattern.

5. The method of claim 1, wherein:
   monitoring the at least the subset of the first set of time and frequency resources comprises monitoring the subset of the first set of time and frequency resources,
   the SSB is associated with a sub-carrier spacing of 30 kilohertz (KHz),
   the first set of time and frequency resources further includes twenty physical resource blocks (PRBs) in a frequency domain,
   the subset of the first set of time and frequency resources includes the four OFDM symbols in the time domain and twelve PRBs of the twenty PRBs in the frequency domain, and
   the second set of time and frequency resources further includes at most twelve PRBs in the frequency domain.

6. The method of claim 5, wherein the second set of time and frequency resources includes two OFDM symbols following the four OFDM symbols of the first set of time and frequency resources.

7. The method of claim 5, wherein the second set of time and frequency resources includes a first OFDM symbol before the four OFDM of the first set of time and frequency resources and a second OFDM symbol following the four OFDM symbols of the first set of time and frequency resources.

8. The method of claim 5, wherein the second set of time and frequency resources includes:
   two OFDM symbols before the four OFDM symbols of the first set of time and frequency resources based on the four OFDM symbols of the first set of time and frequency resources including fifth through eighth OFDM symbols of a slot; or
   two ODFM symbols following four OFDM symbols of the first set of time and frequency resources based on the four OFDM symbols of the first set of time and frequency resources including ninth through twelfth OFDM symbols of a slot.

9. The method of claim 1, wherein monitoring at least the subset of the first set of time and frequency resources includes monitoring only the subset of the first set of time and frequency resources.

10. An apparatus for wireless communication, the apparatus comprising:
   at least one processor; and
   a memory coupled to the at least one processor, wherein the at least one processor is configured to:
      receive, from a base station by a user equipment (UE) having a first type, an initial message that indicates a synchronization signal block (SSB) allocation that includes at least a subset of a first set of time and frequency resources for UEs having a second type, a second set of time and frequency resources allocated to a physical broadcast channel (PBCH) for UEs having the first type, and PBCH repetition information;
      monitor, by the UE, at least the subset of the first set of time and frequency resources allocated to the SSB, the SSB including a primary synchronization signal (PSS), a secondary synchronization signal (SSS), and the PBCH, wherein the first set of time and frequency resources including four orthogonal frequency division multiplexing (OFDM) symbols in a time domain;
      monitor, by the UE, the second set of time and frequency resources allocated to the PBCH for the UEs having the first type, the second set of time and frequency resources including two OFDM symbols in the time domain and the second set of time and frequency resources allocated to repetition of a portion of the PBCH that is allocated to frequency resources that are outside the subset of the first set of time and frequency resources, the repetition of the portion of the PBCH indicated by the PBCH repetition information; and
      receive, by the UE from a base station, the PSS, the SSS, and the PBCH within the at least the subset of the first set of time and frequency resources and the second set of time and frequency resources.

11. The apparatus of claim 10, wherein:
   monitoring the at least the subset of the first set of time and frequency resources comprises monitoring an entirety of the first set of time and frequency resources;
   the SSB is associated with a sub-carrier spacing of 15 kilohertz (KHz) and PBCH repetition;
   the first set of time and frequency resources further includes twenty-four physical resource blocks (PRBs) in a frequency domain; and
   the second set of time and frequency resources further includes the twenty-four PRBs in the frequency domain.

12. The apparatus of claim 11, wherein the second set of time and frequency resources includes a first OFDM symbol before the four OFDM symbols of the first set of time and frequency resources and a second OFDM symbol following the four OFDM symbols of the first set of time and frequency resources.

13. The apparatus of claim 11, wherein the second set of time and frequency resources includes two OFDM symbols following the four OFDM symbols of the first set of time and frequency resources.

14. The apparatus of claim 11, wherein the second set of time and frequency resources includes two OFDM symbols before the four OFDM symbols of the first set of time and frequency resources and one OFDM symbol following the four OFDM symbols of the first set of time and frequency resources.

15. The apparatus of claim 11, wherein the SSB is an only SSB allocated to a slot, and wherein the second set of time and frequency resources includes eight OFDM symbols following the four OFDM symbols of the first set of time and frequency resources.

16. The apparatus of claim 11, wherein the at least one processor is further configured to:
   determine a cell identifier associated with the base station based on the PSS and the SSS; and
   determine whether PBCH repetition is configured based on the cell identifier.

17. A method performed by a base station, the method comprising:
   transmitting, from a base station to a user equipment (UE) having a first type, an initial message that indicates a synchronization signal block (SSB) allocation that includes at least a subset of a first set of time and frequency resources for UEs having a second type, a second set of time and frequency resources allocated to a physical broadcast channel (PBCH) for UEs having the first type, and PBCH repetition information, wherein:
      the first set of time and frequency resources includes four orthogonal frequency division multiplexing (OFDM) symbols in a time domain, and
      the second set of time and frequency resources includes two OFDM symbols in the time domain;
   transmitting, to the UE, at least a portion of the SSB via at least the subset of the first set of time and frequency resources allocated to the SSB for UEs having a second type, the at least a portion of the SSB including a primary synchronization signal (PSS), a secondary synchronization signal (SSS), and a first portion of a physical broadcast channel (PBCH); and
   transmitting, to the UE, a second portion of the PBCH via the second set of time and frequency resources, the second portion of the PBCH corresponding to repetition of a portion of the PBCH that is allocated to frequency resources that are outside the subset of the first set of time and frequency resources.

18. The method of claim 17, wherein frequency resources of the second set of time and frequency resources overlap with frequency resources of the subset of the first set of time and frequency resources, and wherein time resources of the second set of time and frequency resources are different from time resources of the subset of the first set of time and frequency resources.

19. The method of claim 17, wherein the UE having the first type is associated with communications within a 5 megahertz (MHz) bandwidth, and wherein the first set of time and frequency resources cover a bandwidth that is greater than 5 MHz.

20. The method of claim 17, wherein the SSB allocation further includes an SSB pattern.

21. The method of claim 17, wherein:
transmitting the at least the portion of the SSB via the at least the subset of the first set of time and frequency resources comprises transmitting the at least the portion of the SSB via the subset of the first set of time and frequency resources,
the SSB is associated with a sub-carrier spacing of 30 kilohertz (KHz),
the first set of time and frequency resources further includes twenty physical resource blocks (PRBs) in a frequency domain,
the subset of the first set of time and frequency resources includes four OFDM symbols in the time domain and twelve PRBs of the twenty PRBs in the frequency domain, and
the second set of time and frequency resources further includes twelve PRBs in the frequency domain.

22. The method of claim 21, wherein the second set of time and frequency resources includes two OFDM symbols following the four OFDM symbols of the first set of time and frequency resources.

23. The method of claim 21, wherein the second set of time and frequency resources includes a first OFDM symbol before the four OFDM symbols of the first set of time and frequency resources and a second OFDM symbol following the four OFDM symbols of the first set of time and frequency resources.

24. The method of claim 21, wherein the second set of time and frequency resources includes:
two OFDM symbols before the four OFDM symbols of the first set of time and frequency resources based on the four OFDM symbols of the first set of time and frequency resources including fifth through eighth OFDM symbols of a slot; or
two ODFM symbols following the four OFDM symbols of the first set of time and frequency resources based on the four OFDM symbols of the first set of time and frequency resources including ninth through twelfth OFDM symbols of a slot.

25. An apparatus for wireless communication, the apparatus comprising:
at least one processor; and
a memory coupled to the at least one processor, wherein the at least one processor is configured to:
initiate transmission, from a base station to a user equipment (UE) having a first type, an initial message that indicates an synchronization signal block (SSB) allocation that includes at least a subset of a first set of time and frequency resources for UEs having a second type, a second set of time and frequency resources allocated to a physical broadcast channel (PBCH) for UEs having the first type, and PBCH repetition information, wherein:
the first set of time and frequency resources includes four orthogonal frequency division multiplexing (OFDM) symbols in a time domain, and
the second set of time and frequency resources includes two OFDM symbols in the time domain;
initiate transmission, to the UE, of at least a portion of the SSB via at least the subset of the first set of time and frequency resources allocated to the SSB for UEs having the second type, the at least a portion of the SSB including a primary synchronization signal (PSS), a secondary synchronization signal (SSS), and a first portion of physical broadcast channel (PBCH); and
initiate transmission, to the UE, of a second portion of the PBCH via the second set of time and frequency resources, the second portion of the PBCH corresponding to repetition of a portion of the PBCH that is allocated to frequency resources that are outside the subset of the first set of time and frequency resources.

26. The apparatus of claim 25, wherein:
transmitting the at least the portion of the SSB via the at least the subset of the first set of time and frequency resources comprises transmitting the at least the portion of the SSB via an entirety of the first set of time and frequency resources,
the SSB is associated with a sub-carrier spacing of 15 kilohertz (KHz) and PBCH repetition,
the first set of time and frequency resources further includes twenty-four physical resource blocks (PRBs) in a frequency domain, and
the second set of time and frequency resources further includes the twenty-four PRBs in the frequency domain.

27. The apparatus of claim 26, wherein the second set of time and frequency resources includes a first OFDM symbol before the four OFDM symbols of the first set of time and frequency resources and a second OFDM symbol following the four OFDM symbols of the first set of time and frequency resources.

28. The apparatus of claim 26, wherein the second set of time and frequency resources includes two OFDM symbols following the four OFDM symbols of the first set of time and frequency resources.

29. The apparatus of claim 26, wherein the second set of time and frequency resources includes two OFDM symbols before the four OFDM symbols of the first set of time and frequency resources and one OFDM symbol following the four OFDM symbols of the first set of time and frequency resources.

30. The apparatus of claim 26, wherein the PSS and the SSS indicate a cell identifier, the cell identifier indicating whether PBCH repetition is to be configured at the UE.

* * * * *